United States Patent
Wallace

(10) Patent No.: US 10,246,357 B2
(45) Date of Patent: Apr. 2, 2019

(54) SYSTEM AND METHODS FOR REMOVING MINERALS FROM A BRINE USING ELECTRODIALYSIS

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 63 days.

(21) Appl. No.: 15/038,370

(22) PCT Filed: Nov. 24, 2014

(86) PCT No.: PCT/US2014/067176
§ 371 (c)(1),
(2) Date: May 20, 2016

(87) PCT Pub. No.: WO2015/077727
PCT Pub. Date: May 28, 2015

(65) Prior Publication Data
US 2016/0289099 A1    Oct. 6, 2016

Related U.S. Application Data

(60) Provisional application No. 62/062,657, filed on Oct. 10, 2014, provisional application No. 61/908,318, filed on Nov. 25, 2013.

(51) Int. Cl.
*C02F 1/46*    (2006.01)
*B01D 61/44*    (2006.01)
(Continued)

(52) U.S. Cl.
CPC ............ *C02F 1/4693* (2013.01); *C01B 7/035* (2013.01); *C01B 7/0706* (2013.01);
(Continued)

(58) Field of Classification Search
CPC .. C02F 1/4693; C02F 1/44; C02F 9/00; C02F 1/441; C02F 1/442; C02F 2103/08; B01D 61/44
See application file for complete search history.

(56) References Cited

U.S. PATENT DOCUMENTS

| | | |
|---|---|---|
| 2011/0297595 A1 | 12/2011 | Wallace |
| 2012/0080376 A1 | 4/2012 | Komor et al. |
| 2013/0020259 A1* | 1/2013 | Wallace ................ B01D 61/58 210/639 |

FOREIGN PATENT DOCUMENTS

| | | |
|---|---|---|
| CN | 101693564 A | 4/2010 |
| CN | 102701343 A | 10/2012 |

(Continued)

OTHER PUBLICATIONS

International Search Report for Application No. PCT/US14/67176 dated Feb. 11, 2015.
(Continued)

*Primary Examiner* — Arun S Phasge
(74) *Attorney, Agent, or Firm* — Fletcher Yoder, P.C.

(57) ABSTRACT

A method includes treating a first brine stream including a plurality of minerals with an anti-scalant to produce a treated brine. The first brine stream is provided by a wastewater treatment system. The method also includes directing the treated brine to a first nanofiltration (NF) system disposed downstream from and fluidly coupled to the wastewater treatment system, generating a first NF permeate stream and a first NF non-permeate stream from the treated brine in the first NF system, directing the first NF non-permeate stream to a mineral removal system disposed downstream from and fluidly coupled to the first NF system, and removing the plurality of minerals from the first NF non-permeate stream to generate a first overflow stream in the mineral removal system. The first overflow stream comprises at least a (Continued)

portion of the plurality of minerals. The method also includes routing a first portion of the first overflow stream to a hydrochloric acid (HCl) and sodium hydroxide (NaOH) production system disposed downstream from and fluidly coupled to the mineral removal system. The HCl and NaOH production system includes a second NF system that may receive the first portion of the first overflow stream and may generate a second brine stream from the first portion of the first overflow stream. The method further includes directing the second brine stream to a first electrodialysis (ED) system disposed within the HCl and NaOH production system and fluidly coupled to the second NF system. The first ED system may generate HCl and NaOH from the second brine stream.

20 Claims, 7 Drawing Sheets

(51) Int. Cl.
| | |
|---|---|
| C02F 1/469 | (2006.01) |
| C02F 9/00 | (2006.01) |
| C01B 7/07 | (2006.01) |
| C02F 1/44 | (2006.01) |
| C02F 5/08 | (2006.01) |
| C22B 3/22 | (2006.01) |
| C22B 4/02 | (2006.01) |
| C22B 26/10 | (2006.01) |
| C01B 7/03 | (2006.01) |
| C01B 11/06 | (2006.01) |
| C01D 1/04 | (2006.01) |
| C01D 1/28 | (2006.01) |
| C01D 3/08 | (2006.01) |
| C01D 3/16 | (2006.01) |
| C01F 11/24 | (2006.01) |
| C02F 1/04 | (2006.01) |
| C02F 1/20 | (2006.01) |
| C02F 1/42 | (2006.01) |
| C02F 1/66 | (2006.01) |
| C02F 103/06 | (2006.01) |
| C02F 103/08 | (2006.01) |
| C02F 101/10 | (2006.01) |
| C01D 1/38 | (2006.01) |

(52) U.S. Cl.
CPC .......... *C01B 7/0737* (2013.01); *C01B 11/062* (2013.01); *C01D 1/04* (2013.01); *C01D 1/28* (2013.01); *C01D 3/08* (2013.01); *C01D 3/16* (2013.01); *C01F 11/24* (2013.01); *C02F 1/44* (2013.01); *C02F 5/08* (2013.01); *C02F 9/00* (2013.01); *C22B 3/22* (2013.01); *C22B 4/02* (2013.01); *C22B 26/10* (2013.01); *C01D 1/38* (2013.01); *C02F 1/04* (2013.01); *C02F 1/20* (2013.01); *C02F 1/42* (2013.01); *C02F 1/441* (2013.01); *C02F 1/442* (2013.01); *C02F 1/66* (2013.01); *C02F 2101/10* (2013.01); *C02F 2103/06* (2013.01); *C02F 2103/08* (2013.01); *Y02P 10/234* (2015.11)

(56) References Cited

FOREIGN PATENT DOCUMENTS

| | | |
|---|---|---|
| CN | 103253838 A | 8/2013 |
| WO | 0029326 A1 | 5/2000 |
| WO | 2011102848 A1 | 8/2011 |

OTHER PUBLICATIONS

Supplementary European Search Report; EP Application No. EP14864230, dated May 29, 2017.
Algerian Office Action for DZ Application No. 160317 dated Jun. 27, 2017; 1 Page.
Australian Examination Report for AU Application No. 2014352663 dated Nov. 25, 2016; 12 Pages.
Chinese Office Action for CN Application No. 201480073478.5 dated May 31, 2018.

* cited by examiner

SYSTEM AND METHODS FOR REMOVING MINERALS FROM A BRINE USING ELECTRODIALYSIS

CROSS REFERENCE TO RELATED APPLICATION

This application is a national stage of PCT Application No. PCT/US14/67176, entitled "SYSTEM AND METHOD FOR REMOVING MINERALS FROM A BRINE USING ELECTRODIALYSIS", filed on Nov. 24, 2014, which benefits from the priority of U.S. Provisional Patent Application No. 61/908,318, entitled "System for Removing Minerals from a Brine Using Electrodialysis," filed Nov. 25, 2013, and U.S. Provisional Patent Application No. 62/062,657, entitled "Mineral Recovery System," filed Oct. 10, 2014. Each of the foregoing applications are hereby incorporated by reference in its entirety.

BACKGROUND

The subject matter disclosed herein relates generally to mineral extraction and, more particularly, to a system and method for removing minerals from a brine using electrodialysis.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies for both drinking water and agriculture is important. One method for obtaining an alternative source of potable water uses desalination systems to produce the potable water.

The desalination process involves the removal of salts from seawater, agricultural run-off water, and/or brackish ground water brines to produce potable water. Desalination may use an assortment of filtration methods, such as nanofiltration and reverse osmosis, to separate the raw stream into a desalinated water stream and a tailing stream. The tailing streams may contain various salts and other materials left over after the desalination process. Indeed, disposal of the tailing streams produced by desalination may result in soil degradation and ground water contamination. Thus, alternative and innovative uses of the tailing streams may reduce undesirable results of disposing the tailing streams.

One such alternative use involves processing the tailing stream to remove valuable minerals. In particular, inland brackish water and seawater may be rich in sulfates, magnesium, calcium, and other minerals. Sulfates, mainly in the form of gypsum, have a variety of commercial uses, including, but not limited to building materials (e.g., drywall or sheetrock), skin creams, shampoos, and dental impression plasters. In addition, gypsum may be used as a fertilizer and/or soil conditioner in the farming industry. Magnesium may also be extracted in the form of magnesia (e.g., magnesium oxide) which is used in the refractory industry due to its fireproofing capabilities as well as in the medical field as an ingredient in laxatives. As the traditional deposits for these minerals are depleted, the capacity to extract them from alternative sources represents both a valuable commercial opportunity as well as a means for lessening the environmental impact caused by the disposal of waste streams high in salt content.

Existing procedures for the removal of minerals often exhibits sub-optimal efficiency. For example, evaporation pools require a large area of land and often produce low purity mixed salts with minimal commercial value. In addition, a waste mixed salt solid resulting from the evaporation process may leach into the ground water supply. Other methods of extraction involve processing the tailing stream produced in brackish water or seawater desalination plants. However, current mineral extraction procedures for the tailing stream may not operate efficiently.

As described above, desalination systems may employ one or a combination of nanofiltration and reverse osmosis to facilitate the desalination and removal process. Following an initial separation of a potable water stream from a tailing stream, the tailing stream may be processed further by a mineral removal system. For example, various precipitation techniques may be performed that facilitate removal of dissolved minerals from a solution. However, the high salt concentration in the tailing stream may increase the solubility of many of these valuable minerals and, as a consequence, decrease the efficiency in which these minerals may be precipitated. Inadequate removal of these minerals may have a negative impact on the mineral removal system itself. For example, incomplete gypsum removal may result in scaling of filtration and/or reverse osmosis membranes, thereby reducing the life and permeate flux of these membranes. Frequent replacement and repair of such mineral removal system components, in addition to the sub-optimal extraction efficiency, may result in elevated cost of mineral removal prompting the need for further optimization of the mineral removal system.

Furthermore, existing procedures may be inadequate to remove impurities from minerals. The ineffective removal of such impurities, including arsenic, boric acid, and silica, may result in undesirable impurities in removed minerals and decreased productivity of the mineral removal plant due to membrane scaling. Thus, an improved mineral removal system may facilitate higher purity of valuable minerals, decrease impurities, increase efficiency, and increase the life-span of components of the mineral removal system.

BRIEF DESCRIPTION

In a first embodiment, a method includes treating a first brine stream including a plurality of minerals with an anti-scalant to produce a treated brine. The first brine stream is provided by a wastewater treatment system. The method also includes directing the treated brine to a first nanofiltration (NF) system disposed downstream from and fluidly coupled to the wastewater treatment system, generating a first NF permeate stream and a first NF non-permeate stream from the treated brine in the first NF system, directing the first NF non-permeate stream to a mineral removal system disposed downstream from and fluidly coupled to the first NF system, and removing the plurality of minerals from the first NF non-permeate stream to generate a first overflow stream in the mineral removal system. The first overflow stream comprises at least a portion of the plurality of minerals. The method also includes routing a first portion of the first overflow stream to a hydrochloric acid (HCl) and sodium hydroxide (NaOH) production system disposed downstream from and fluidly coupled to the mineral removal system. The HCl and NaOH production system includes a second NF system that may receive the first portion of the first overflow stream and may generate a second brine stream from the first portion of the first overflow stream. The method further includes directing the second brine stream to a first electrodialysis (ED) system disposed within the HCl and NaOH production system and fluidly coupled to the second NF system. The first ED system may generate HCl and NaOH from the second brine stream.

In a second embodiment, a system includes a first nanofiltration (NF) system that may generate a first NF permeate stream and a first NF non-permeate stream from a first brine stream from a water treatment system and a mineral removal system disposed downstream from and fluidly coupled to the first nanofiltration system. The mineral removal system may receive the first NF non-permeate stream and to output an overflow stream. The system also includes a hydrochloric (HCl) and sodium hydroxide (NaOH) production system including a second NF system disposed downstream from and fluidly coupled to the mineral removal system and a first electrodialysis (ED) system. The second NF system may receive an overflow stream from the mineral removal system to generate a second brine stream, and the first ED system may receive the second brine stream to generate HCl and NaOH.

In a third embodiment, a system includes a hydrochloric acid (HCl) and sodium hydroxide (NaOH) production system including a nanofiltration (NF) system that may generate an NF permeate stream and an NF non-permeate stream from a first brine stream and a first electrodialysis (ED) system downstream from and fluidly coupled to the NF system. The first ED system is may receive the NF permeate stream and may generate a second brine stream. The system also includes a mineral removal system fluidly coupled to the HCl and NaOH production system and that may output the first brine stream. The mineral removal system includes a mineral removal section that may remove minerals from a third brine stream generated in wastewater treatment system. The mineral removal system also includes an overflow tank fluidly coupled to the mineral removal section and the NF system. The overflow tank may receive an overflow stream from the mineral removal section and may direct at least a portion of the overflow stream to the NF system to generate the NF permeate stream and the NF non-permeate stream.

In a fourth embodiment, a system includes an ion exchange softener fluidly coupled to a wastewater treatment system. The first ion exchange softener may receive a first brine stream from the wastewater treatment system and to remove a plurality of minerals from the first brine stream to generate a second brine stream including the plurality of minerals and a third brine stream. The system also includes a mineral removal system disposed downstream from the ion exchange softener and that may receive the second brine stream and to generate a sodium chloride (NaCl) brine stream and an acid and caustic production system disposed downstream from and fluidly coupled to the mineral removal system. The acid and caustic production system includes a first electrodialysis (ED) system that may receive the NaCl brine stream from the mineral removal system and to generate hydrochloric acid (HCl) and sodium hydroxide (NaOH) from the NaCl brine stream. The system also includes a second ED system disposed downstream from the ion exchange softener and upstream of the acid and caustic production system. The second ED system is fluidly coupled to the ion exchange softener and to the acid and caustic production system, and the second ED may generate desalinated water from the third brine stream and an ED concentrate stream. The second ED system may direct the ED concentrate stream to the acid and caustic production system.

In a fifth embodiment, a method includes directing a wastewater brine stream from a water treatment system to a first ion exchange softener disposed upstream of a mineral removal system. The wastewater brine stream includes a plurality of minerals. The method also includes generating a first softened brine stream and a first chloride brine stream from the wastewater brine stream via the first ion exchange softener. The first chloride brine stream includes a first portion of the plurality of minerals and the first softened brine stream includes a second portion of the plurality of minerals. The method also includes supplying the first chloride brine stream to the mineral removal system to recover the first portion of the plurality of minerals, supplying the first softened brine stream to a first electrodialysis (ED) system that may generate a second softened brine stream, and generating hydrochloric acid (HCl) and sodium hydroxide (NaOH) from the second softened brine stream via an acid and caustic production system downstream from and fluidly coupled to the first ED system.

In a sixth embodiment, a method includes removing a plurality of minerals from a first brine stream via an ion exchange softener disposed upstream of a mineral removal system. The first brine stream is output from a waste treatment system, the ion exchange softener includes a resin, and the resin includes an acid portion and a neutral portion. The method also includes reacting bicarbonate in the first brine stream with the acid portion of the resin within the ion exchange softener to generate carbon dioxide, and generating a softened brine stream and a second brine stream from the first brine stream via the ion exchange softener. The second brine stream includes the plurality of minerals and is directed toward the mineral removal system, and the softened brine stream includes the carbon dioxide and is directed toward an electrodialysis (ED) system that may generate desalinated water.

DRAWINGS

These and other features, aspects, and advantages of the present disclosure will become better understood when the following detailed description is read with reference to the accompanying drawings in which like characters represent like parts throughout the drawings, wherein.

Figure 5:
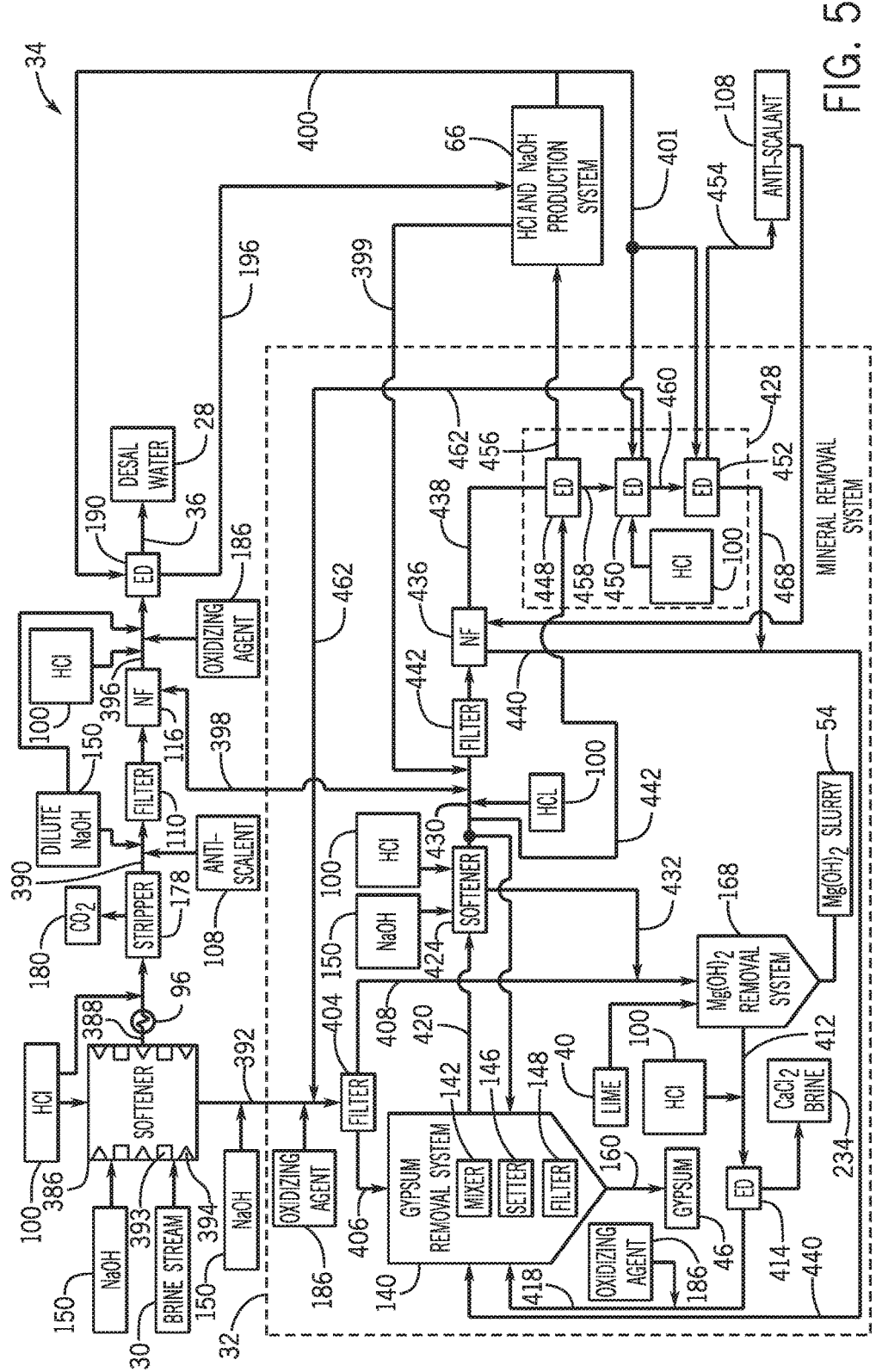
FIG. 5 is a block diagram of an embodiment of the mineral removal plant of FIG. 1, the mineral removal plant having an ion exchange softener upstream of the mineral removal system, in accordance with aspects of the present disclosure.
Figure 6:
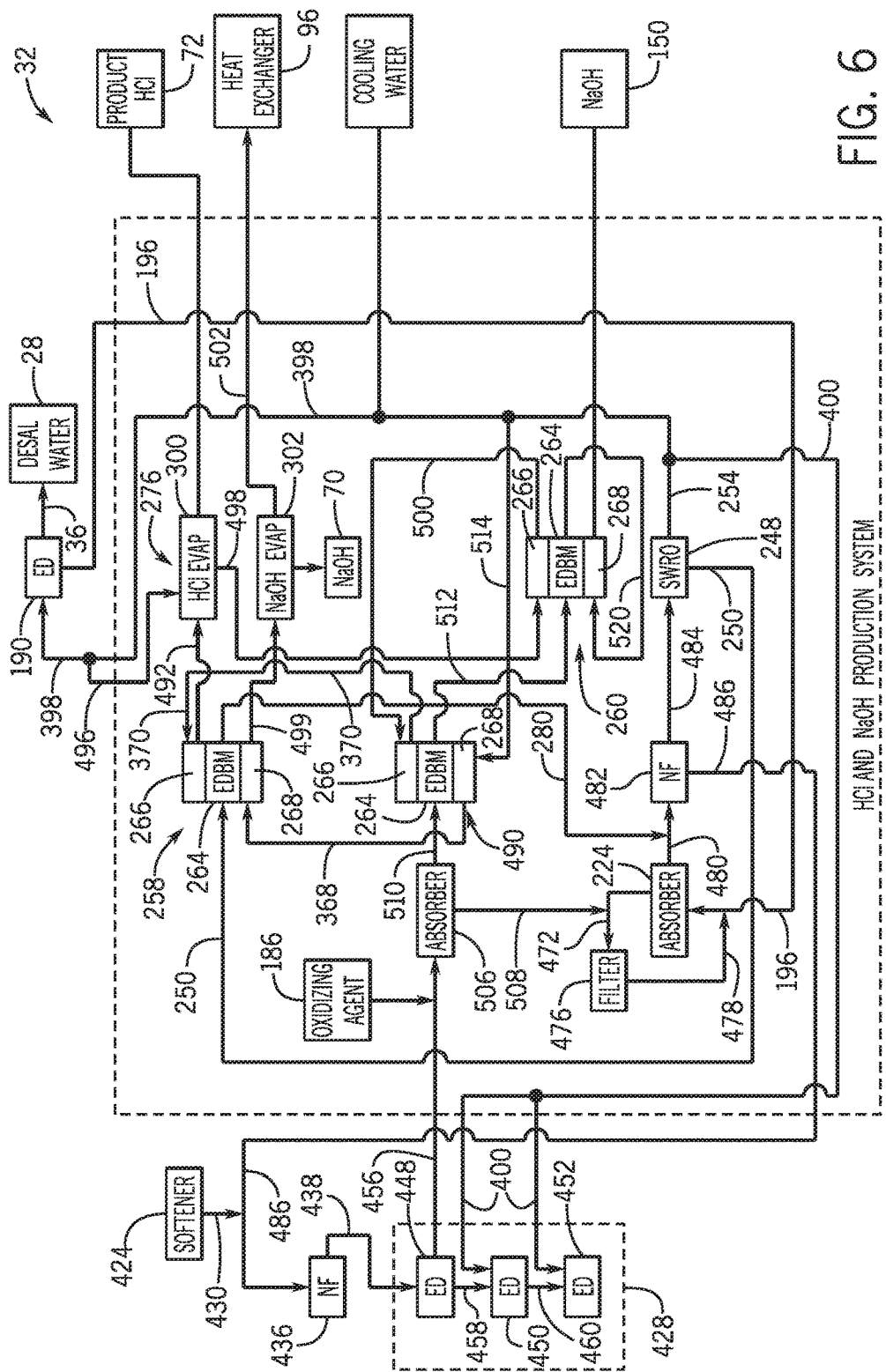
Figure 7:
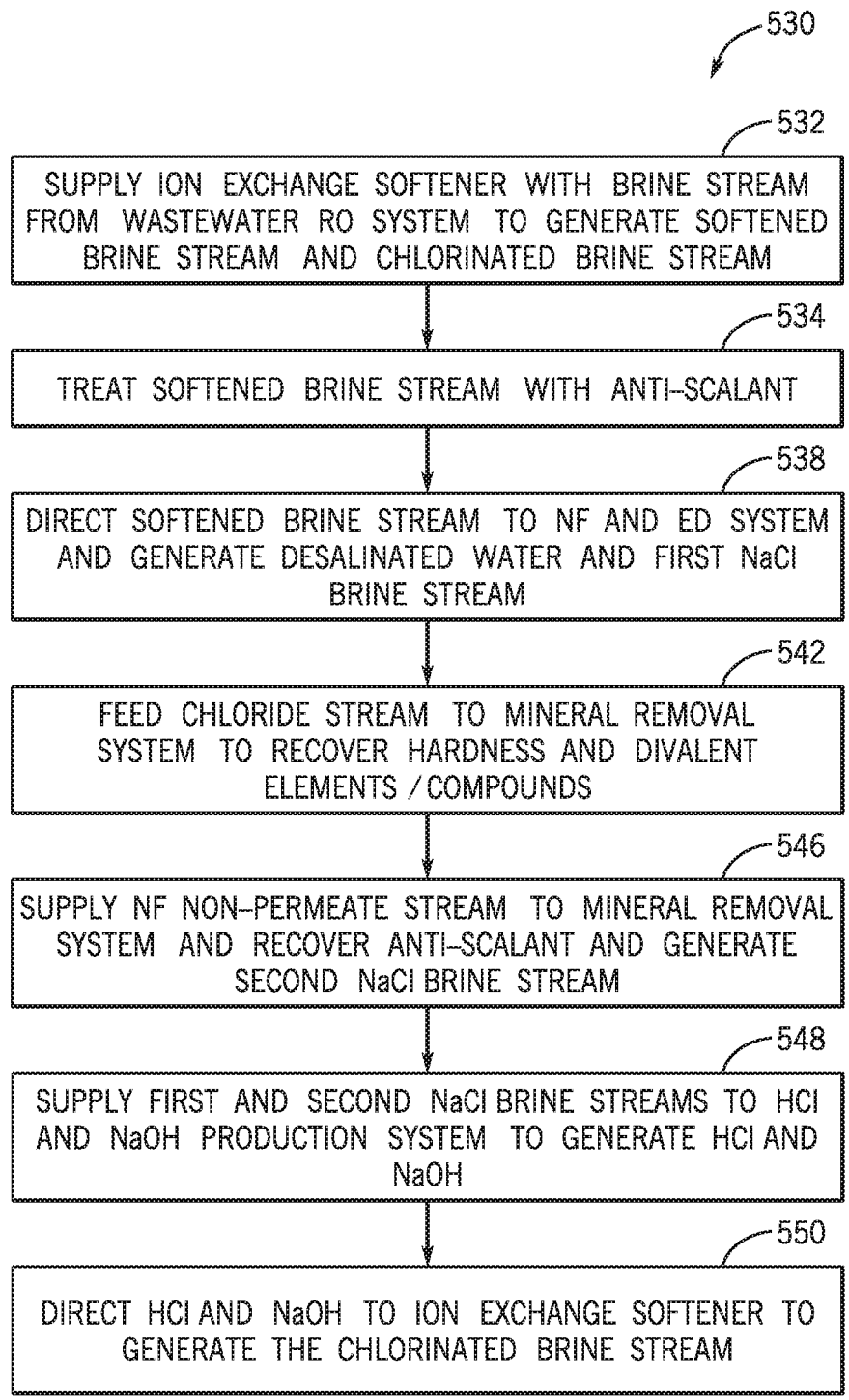

FIG. 6 is a block diagram of another embodiment of the mineral removal plant of FIG. 5 illustrating the HCl and NaOH production system, in accordance with aspects of the present disclosure; and FIG. 7 is a flow diagram of an embodiment of a method for mineral removal and production of HCl and NaOH using the water processing system of FIGS. 5 and 6, in accordance with aspects of the present disclosure;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a water processing system (e.g., desalination system) configured to desalination of water (e.g., seawater, agricultural run-off water, and/or brackish ground water) and recover minerals extracted from the desalinated water. In water desalination processes, ion separation systems are used to extract minerals (e.g., calcium, magnesium, sodium, and sulfate) from tailing streams (e.g., the nanofiltration and reverse osmosis non-permeate streams) that may otherwise be discarded. The extracted minerals may be recovered as industrial grade products for commercial use. During desalination of the water and mineral recovery, the minerals may cause scaling of system components (e.g., nanofiltration (NF) system, electrodialysis systems, reverse osmosis systems, etc.) used for desalination of the water. This may increase the operational costs of the system due, in part, to decommissioning and maintenance. For example, scale formed on systems components may need to be removed from the system components and system membranes may need to be replaced. Therefore, it may be advantageous to solublize and/or remove the scale forming compounds to mitigate scaling of system components.

Figure 1:
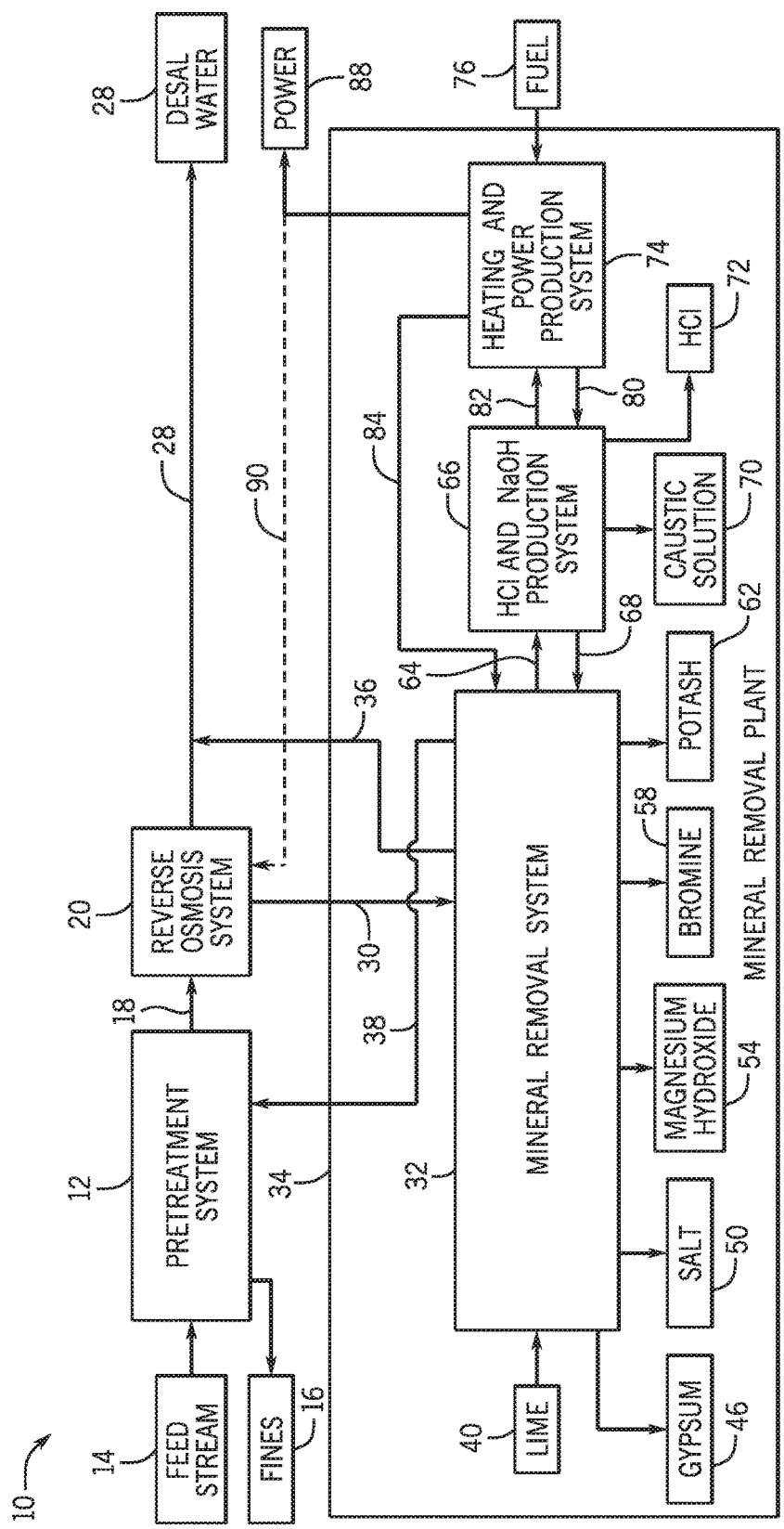
FIG. 1 is a block diagram of an embodiment of a water processing system, in which the water processing system includes a water removal plant having a mineral removal system and a hydrochloric acid (HCl) and sodium hydroxide (NaOH) production system, in accordance with aspects of the present disclosure.

FIG. 1 is a block diagram of an embodiment of a water processing system 10 that may use chemical additives to mitigate scaling of system components used during desalination of water. For example, the water processing system 10 may be part of a water desalination system, wastewater treatment system, water purification system, oil and gas brine treating system or any other suitable water processing system. In the illustrated embodiment, the water processing system 10 is used to produce desalinated water from a feed stream and to remove minerals from the feed stream. For example, the water processing system 10 may be used to produce high purity agricultural grade gypsum ($CaSO_4 \cdot 2H_2O$) (e.g., approximately greater than 97 weight percent (wt %) gypsum on a dry basis), industrial grade caustic (e.g., approximately greater than 97 wt % sodium hydroxide (NaOH) on a dry basis), industrial grade magnesium hydroxide ($Mg(OH)_2$) (e.g., approximately greater than 98 wt % MgOH on an ignited basis, or on an ignited oxide basis) suitable for industrial magnesia refractory, industrial grade sodium chloride (NaCl) (e.g., approximately greater than 99.9 wt % NaCl on a dry basis), concentrated HCl for commercial use (e.g., approximately 10 wt % to 22 wt %), and/or desalinated water (e.g., approximately less than 1 gram/Liter (g/L) (1000 parts per million (ppm)) total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain NaCl, sulfate ($SO_4$), calcium (Ca), magnesium (Mg), and/or silicon dioxide (silica or $SiO_2$). In certain embodiments, the feed stream 14 may contain approximately 0.50 g/L (500 ppm) to approximately 3.00 g/L (3,000 ppm) NaCl, approximately 0.10 g/L (100 ppm) to approximately 1.50 g/L (1,500 ppm) $SO_4$, approximately 0.01 g/L (10 ppm) to approximately 0.80 g/L (800 ppm) Ca and Mg, and/or approximately 0.01 g/L (10 ppm) to approximately 0.30 g/L (300 ppm) $SiO_2$. Furthermore, in certain embodiments, the feed stream 14 may have a pH range between approximately 5 and 9. For example, the feed stream 14 may have a pH of approximately 8.

The pretreatment system 12 receives the feed stream 14 and removes solid materials (e.g., fines 16), such as iron (Fe) and manganese (Mn), from the feed stream 14. The pretreatment system 12 provides a pretreated feed stream 18 to a first reverse osmosis (RO) system 20. The first RO system 20 receives the pretreated feed stream 18 and produces a desalinated water stream 28. In certain embodiments, the desalinated water stream 28 may include $SiO_2$. Moreover, the desalinated water stream 28 may have a pH of approximately 7.5. Furthermore, the first RO system 20 provides a brine stream 30 to a mineral removal system 32. In certain embodiments, the desalinated water stream 28 may be approximately 70 percent to approximately 90 percent of the output from the first RO system 20, and the brine stream 30 may be approximately 10 percent to approximately 30 percent of the output from the first RO system 20. For example, in some embodiments, the desalinated water stream 28 may be approximately 80 percent of the output from the first RO system 20, and the brine stream 30 may be approximately 20 percent of the output from the first RO system 20. As may be appreciated, while the illustrated embodiment uses the first RO system 20, other embodiments may use NF system in place of the first RO system 20.

The mineral removal system 32 may be part of a mineral removal plant 34. The mineral removal plant 34 is configured to remove minerals, elements, and/or compounds from the brine stream 30. As may be appreciated, the brine stream 30 may be provided to the mineral removal plant 34 from any suitable source and/or system. In certain embodiments, the brine stream 30 may include substantial amounts of salts, such as NaCl, sodium sulfate ($Na_2SO_4$), calcium (Ca), and/or magnesium (Mg). As discussed above, treating the brine stream 30 (e.g., chemically or mechanically) may mitigate scaling (precipitation) of the salts. That is, the brine stream 30 may be treated with chemical additives that increase a solubility of the scaling components in the brine stream 30 and/or soften the brine stream 30 to decrease hardness and divalent compounds, as discussed in further detail below. The mineral removal system 32 may provide one or more desalination streams 36 that include desalinated water, which may contain $SiO_2$. Furthermore, the one or more desalination streams 36 may include a disinfectant and/or oxidant. The disinfectant and/or oxidant may be provided to the pretreatment system 12 via a disinfectant stream 38.

A lime based material 40 (e.g., lime, quick lime, dolomitic lime, etc.) may be provided to the mineral removal system 32 to facilitate mineral removal from the brine stream 30. During operation, the mineral removal system 32 may be configured to remove any suitable minerals, elements, and/or compounds from the brine stream 30. For example, the mineral removal system 32 may provide a gypsum stream 46 (e.g., agricultural grade gypsum), a salt stream 50 (e.g., industrial grade sodium chloride), a magnesium hydroxide stream 54 (e.g., industrial grade magnesium hydroxide), a bromine stream 58, a potash stream 62, and/or other mineral streams depending on the mineral content of the brine stream 30.

The mineral removal system 32 may generate additional streams that may be collected for commercial use and/or utilized in a downstream process of the water processing system 10. In certain embodiments, the mineral removal system 32 may provide one or more output streams 64 to an HCl and NaOH production system 66. For example, the mineral removal system 32 may provide NaCl brine to the HCl and NaOH production system 66. The HCl and NaOH production system 66 may generate concentrated HCl via an ion separation process (e.g., ED process) followed by an evaporation process. Furthermore, the mineral removal system 32 may receive one or more input streams 68 from the HCl and NaOH production system 66. The one or more input streams 68 may provide the mineral removal system 32 with HCl and/or caustic (e.g., NaOH) produced by the HCl and NaOH production system 66. In addition, the HCl and NaOH production system 66 may generate a caustic solution 70 (e.g., concentrated industrial grade NaOH) and/or a concentrated industrial grade HCl product solution 72 that is not used by the mineral removal system 32 (e.g., produced to be sold).

The mineral removal plant 34 also includes a heating and power production system 74. The heating and power production system 74 may include a natural gas engine and/or a boiler. The heating and power production system 74 may be configured to receive a fuel 76. The fuel 76 may be any suitable fuel, such as natural gas, synthetic natural gas (e.g., syngas), or combination thereof. The heating and power production system 74 may provide power, steam, hot water, any suitable heated fluid, and so forth to the HCl and NaOH production system 66, as indicated by arrow 80. Moreover, the heating and power production system 74 may receive a cooled fluid stream 82 (e.g., cooled water) from the HCl and NaOH production system 66. As illustrated, the heating and power production system 74 may also provide power to the mineral removal system 32, as indicated by arrow 84. Additionally, the heating and power production system 74 may provide power 88 to another system and/or the first RO system 20, as indicated by arrow 90.

Figure 2:
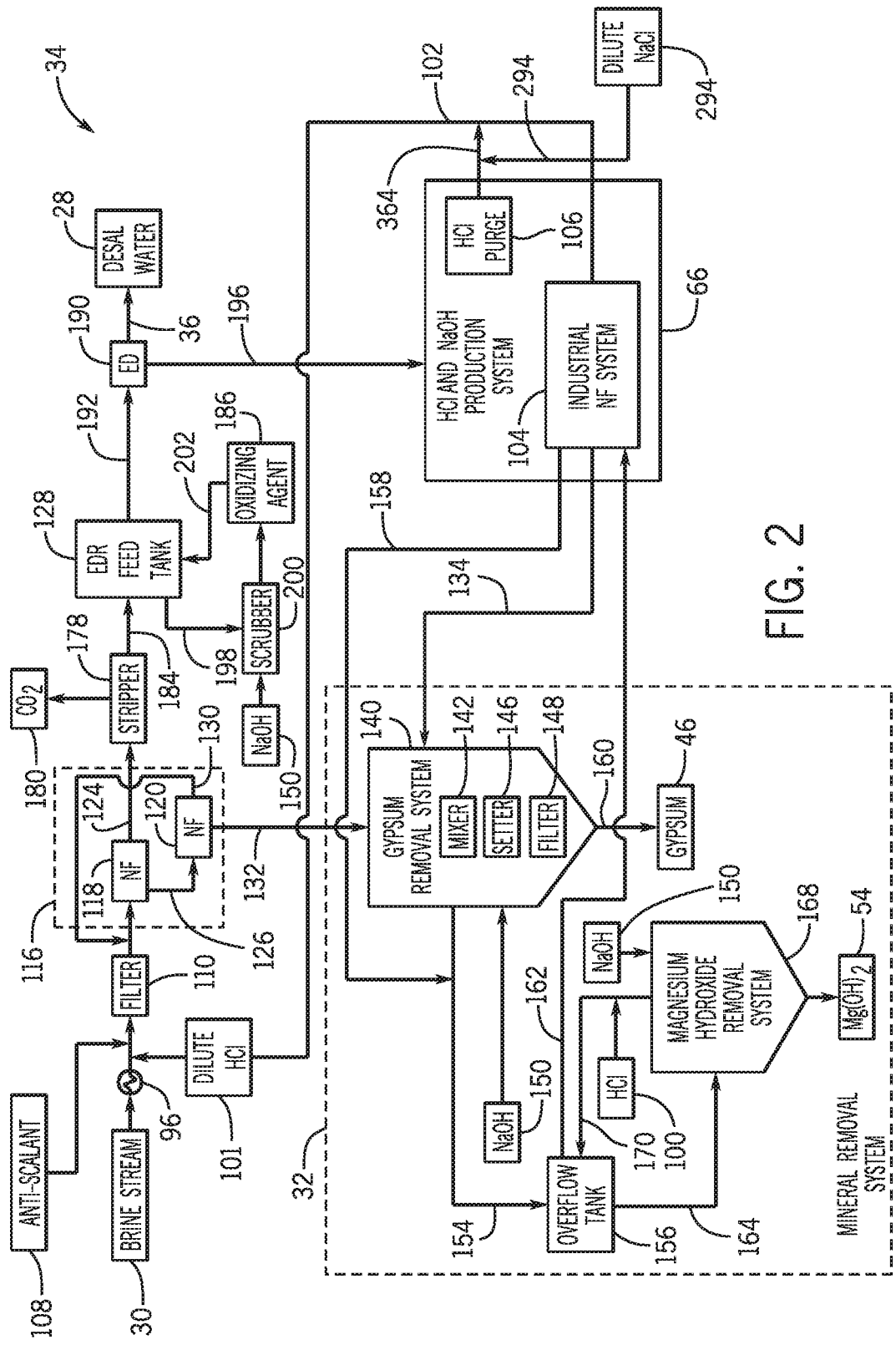
FIG. 2 is a block diagram of an embodiment of the mineral removal plant of FIG. 1, in which the mineral removal plant uses a chemical additive to treat a brine stream upstream of the mineral removal system.

FIG. 2 is a block diagram of an embodiment of the mineral removal plant 34 configured to treat the brine stream 30 with chemical additives that mitigate scaling. As discussed above, the brine stream 30 includes minerals such as $NaSO_4$, $SiO_2$, calcium, and magnesium that form scale on system components during desalination. Therefore, in certain embodiments, the brine stream 30 is heated and treated with HCl before desalination. For example, in the illustrated embodiment, the brine stream 30, pressurized to between approximately 100 pounds per square inch gauge (psig) and approximately 150 psig, flows through a heat exchanger 96 that uses water, which is heated in the HCl and NaOH production system 66, to heat the brine stream 30 to between approximately 30° C. and approximately 40° C. (approximately 90° F. and approximately 100° F.). Before or after heating, the brine stream 30 is treated with dilute HCl 101 (e.g., less than approximately 1 wt % HCl), which is generated in a first nanofiltration (NF) system 104 and an HCl purge system 106, as illustrated by arrow 102. In certain embodiments, the first NF system 104 may form part of the HCl and NaOH production system 66, as discussed in further detail below with reference to FIG. 3. The HCl 100 adjusts a pH of the brine stream 30 to less than approximately 5. The increased temperature and reduced pH of the brine stream 30 increase the solubility of silica ($SiO_2$), thereby reducing scaling of the silica in downstream system components (e.g., nanofiltration and electrodialysis systems). Moreover, the HCl 100 reacts with bicarbonate in the brine stream 30 and generates soluble $CO_2$ gas, thereby removing the bicarbonate from the brine stream 30. In addition to the HCl 100, an anti-scalant 108 may be added to the brine stream 30. The anti-scalant 108 may reduce scaling of hardness and divalent compounds/elements and other minerals (e.g., $NaSO_4$). Non-limiting examples of the anti-scalant 108 include gypsum barium sulfate anti-scalants, such as Hypersperse MDC706 (GE Water and Process Technology), Vitec 7000 (Avista Technologies Inc) any other suitable anti-scalant, and combinations thereof. The brine stream 30, HCl 100, and anti-scalant 108 may be mixed in a mixer (e.g., a static mixer) to provide substantially uniform mixing (e.g., to generate a substantially homogenous mixture). In certain embodiments, the brine stream 30 may be filtered with a first filter 110 downstream from the heat exchanger 96. The first filter 110 may remove any particulates (e.g., calcium fluoride or barium sulfate) that may have been present in the brine stream 30 or formed during heating and treatment with the HCl 100 and/or anti-scalant 108. The filter (e.g., the first filter 110) may be a 4 to 6 micron cartridge filter. However, any other suitable filter may be used to remove the particulates.

Following heating, chemical treatment, and filtering, the brine stream 30 may be fed to a second nanofiltration (NF) system 116. In the illustrated embodiment, the second NF system 116 includes NF units 118 and 120. The NF units 118, 120 may be single stage or multiple stage units. For example, in one embodiment, the NF units 118, 120 may be two, three, four or more stage NF units. In other embodiments, the NF units 118, 120 may be single stage NF units. In another embodiment, the NF units 118, 120 may be a combination of single and multiple stage NF units. For example, the NF unit 118 may be a two stage NF unit and the NF unit 120 may be a one stage NF unit. The NF units 118, 120 separate the brine stream 30 into a low pressure permeate stream (e.g., between approximately 5 psig and approximately 20 psig) containing sodium chloride (NaCl) and a concentrated stream having the hardness and divalent compounds/elements (e.g., Ca, Mg, and $SO_4$). In the illustrated embodiments, the NF unit 118 generates a first NF permeate stream 124 and a first NF concentrated stream 126.

The first NF concentrated stream 126 is fed to the NF unit 120 and the first NF permeate stream 124 is fed to an electrodialysis reversal (EDR) feed tank 128. Similarly, the NF unit 120 generates a second NF permeate stream 130 and a second NF concentrated stream 132 from the first NF concentrated stream 126. However, unlike the first NF permeate stream 124, the second NF permeate stream 130 may have an undesirable amount of calcium, magnesium, and/or sulfate. Therefore, the second NF permeate stream 130, or a portion of the stream 130, is recycled back to the fed (e.g., a first NF stage feed) of the first NF unit 118 to decrease a concentration of calcium, magnesium, and sulfate in the NF permeate stream 124. In embodiments having a three stage NF system, a third stage permeate is recycled back to the first stage NF feed.

The second NF concentrated stream 132, which contains the calcium, magnesium, and sulfate, is fed to the mineral removal system 32 to generate gypsum 46 and magnesium hydroxide 54. For example, the second NF concentrated stream 132 is fed to a gypsum removal system 140. In addition, a third NF concentrate stream 134 from the first NF system 104 is also routed to the gypsum removal system 140. The gypsum removal system 140 recovers the Ca and $SO_4$ from the second NF concentrated stream 132, thereby generating gypsum 46. The gypsum removal system 140 may include a mixer 142, a settler 146, and a second filter 148 that facilitate removal of gypsum 46 from the second NF concentrated stream 132. The Ca and $SO_4$ in the stream 132 react in the gypsum removal system 140 to precipitate the gypsum 46. In certain embodiments, approximately 50% to approximately 70% of the $SO_4$ in the stream 132 is removed. The presence of gypsum 46 seed crystals in the mixer 142 (e.g., a turbulent mixer) may facilitate gypsum precipitation kinetics, thereby enabling rapid gypsum precipitation. Moreover, in certain embodiments, the mixer 142 may have a residence time of greater than approximately 2 hours. Therefore, the large residence time (e.g., greater than approximately 1 hour) in combination with turbulent mixing and a large solid content (e.g., greater than approximately 10 wt %), may enable formation of gypsum crystals having an average particle size of 100 microns or more. The larger gypsum crystals may facilitate removal of the gypsum 46 in the settler 146. The mixer 142 may be operated at a pH of between approximately 3 and approximately 5 to reduce the effectiveness of the anti-sealant 108 added to the brine stream 30, thereby facilitating precipitation of the gypsum 46.

In the settler 146, the gypsum crystals settle and the saturated near solids free solution is decanted off. In certain embodiments, NaOH 150 may be added to the settler 146. The NaOH 150 may increase the pH from the mixer 142 to between approximately 8 to approximately 9. The alkaline pH in the settler 146 may cause precipitation of silica, as magnesium silicate. In addition, the alkaline pH may also result in precipitation of trace amounts of iron as ferric hydroxide (e.g., $Fe(OH)_3$) and iron silicate, thereby enhancing settling of the gypsum 46. A gypsum settler overflow stream 154 enriched with magnesium (e.g., magnesium chloride ($MgCl_2$)) is fed to an overflow tank 156. In certain embodiments, a third NF permeate stream 158 from the first NF system 104 may be combined with the gypsum settler overflow stream 154 to desaturate the gypsum settler overflow stream 154 and to reduce scaling of gypsum in downstream equipment. For example, the gypsum settler overflow stream 154 may have a gypsum saturation of between approximately 105% and approximately 110% (approximately 3,000 mg/L to approximately 8,000 mg/L dissolved gypsum) and contain trace amounts of fine gypsum solids (between approximately 1 ppm and approximately 10 ppm gypsum solids). Therefore, the third NF permeate stream 158 may be used to dilute the gypsum settler overflow stream 154 to decrease gypsum saturation to below 100% and dissolve any fine gypsum solids to prevent scaling in the downstream equipment. As such, precipitation of the gypsum 46 in the overflow tank 156 and other downstream system components may be decreased.

The settler bottoms (e.g., the settled gypsum 46) may be routed to a hydroclone and filter (e.g., the second filter 148) to wash (e.g., with desalinated product water) and concentrate the gypsum 46 into a saleable washed filter cake. In certain embodiments, the filter cake may include approximately 70 wt % to approximately 100 wt % gypsum 46. For example, the filter cake may include approximately 90 wt % gypsum 46. Thus, gypsum 46 is provided as an output 160 from the gypsum removal system 140. A portion of the settler bottoms may be fed to the mixer 142 to maintain a desired solids loading for precipitation of the gypsum 46. A filtrate from the second filter 148 is recycled to the settler 146.

The overflow tank 156 directs a first overflow portion 162 to the HCl and NaOH production system 66. For example, in the illustrated embodiment, the overflow tank 156 feeds the first overflow portion 162 to the first NF system 104. The first NF system 104 may use the first overflow portion 162 to generate the third NF concentrate stream 134 and the third NF permeate stream 158. Therefore, export of water from the dilute NaCl stream 163 to dilute acid stream 102 provides the water balance in the mineral removal system 32. A second overflow portion 164 is fed to a magnesium hydroxide removal system 168. As discussed above, the gypsum settler overflow stream 154 is enriched with magnesium. The magnesium in the brine stream 30 is concentrated by a factor of between approximately 5 and approximately 15 in the second NF concentrated stream 132 and the third NF concentrated stream 134 by the NF systems 116 and 104. Therefore, the magnesium hydroxide removal system 168 removes and recovers the magnesium in the second overflow portion. Similar to the gypsum removal system 140, in certain embodiments, the magnesium hydroxide removal system 168 may also include a mixer, a settler, and a filter to facilitate removal of the magnesium hydroxide 54 from the second overflow portion 164. In some embodiments, the magnesium hydroxide removal system 168 may be configured to remove approximately 90 to 98% of the Mg in the second overflow portion 164.

A similar arrangement to the gypsum removal system 140 (e.g., mixer 142, settler 146, filter 148, etc.) may be used to produce a washed magnesium hydroxide filter cake and a low magnesium effluent brine. Overflow from the filter of the magnesium hydroxide removal system 168 may be fed to the settler and treated with caustic (e.g., NaOH). The caustic reacts with $MgCl_2$ to generate the magnesium hydroxide 54. A pH of the magnesium hydroxide settler is maintained at between approximately 10 and approximately 11 such that excess hydroxide (OH) is reduced. Solids in the magnesium hydroxide settler mixer section may be maintained at between approximately 4 wt % to approximately 15 wt % to increase a number of crystal growth sites, and thereby increase magnesium hydroxide crystal size and decrease fines in the magnesium effluent brine. A magnesium settler overflow stream 170 may be fed to the overflow tank 156 and recycled through the magnesium hydroxide removal system 168, as part of the second overflow portion 164, and/or fed to the HCl and NaOH production system 66, as part of the first overflow portion 160, as discussed in detail below with reference to FIG. 6. In certain embodiments, HCl 100 may be added to the stream 170 to decrease pH to between approximately 6.5 and approximately 8.5 and dissolve any entrained magnesium hydroxide fines. The HCl 100 may be added to stream 170 upstream of the overflow tank 156 or may be added to the overflow tank 156.

As discussed above, the second NF system 116 also generates and directs the first NF stream 124 to the EDR feed tank 128. The first NF permeate stream 124 may include between approximately 0.5 wt % and approximately 1.0 wt % sodium chloride (NaCl). The NaCl may be used by the HCl and NaOH production system 66, downstream of the EDR feed tank 128, for production of HCl 72, 100 and NaOH 70, 150. Before feeding the first NF permeate stream 124 to the EDR feed tank 128, the first NF permeate stream 124 is degassed in an air stripper 178, thereby removing $CO_2$ 180 from the first NF permeate stream 124 and generating a degassed brine stream 184. As discussed above, the brine stream 30 may be treated with HCl 100 to convert bicarbonate to $CO_2$ 180, thereby removing bicarbonate from the brine stream 30. The stripper 178 directs the degassed brine stream 184 to the EDR feed tank 128 for further processing.

While in the EDR feed tank 128, the degassed brine stream 184 may be treated with an oxidizing agent 186 to facilitate removal of arsenic (As) from the first NF permeate stream 124 and to generate a low chlorine residual (e.g., less than approximately 0.5 mg/L chlorine) in the EDR feed tank 128. For example, the brine stream 30 may have dissolved arsenic. The second NF system 116 may not remove arsenic in the brine stream 30 if the arsenic is in the reduced arsenite form ($H_2AsO_3$). Addition of the oxidizing agent 186 (e.g., sodium hypochlorite) generally results in oxidation of arsenic, thereby generating arsenate ($AsO_4H_3$). The arsenate may be ionized and removed downstream, as discussed below with reference to FIG. 3.

The EDR feed tank 128 outputs the degassed brine stream 184 to a first electrodialysis (ED) system 190 (e.g., an ED reversal system) that removes salts, such as NaCl, from the degassed brine stream 184, as illustrated by arrow 192. Accordingly, the first ED system 190 generates at least a portion of the desalinated stream 36 and a first ED brine stream 196 (having between approximately 4 wt % and approximately 7 wt % NaCl). The desalinated stream 36 meets potable water quality standards and may be combined with the desalinated water 28 generated by the first RO system 20 for use in various processes throughout the system 10. The desalinated water 28 may include silica (e.g., between approximately 50 parts per million (ppm) and approximately 150 ppm). The first ED brine stream 196 is fed to the HCl and NaOH production system 66 to enable production of the concentrated industrial grade HCl and the concentrated industrial grade NaOH (e.g., HCl 72, 100 and the caustic solution 70), as discussed in further detail below.

In certain embodiments, a portion of the degassed brine stream 184 may be used to rinse electrodes in the first ED system 190. The electrode rinse water may be recirculated back to the EDR feed tank 128. Hydrogen and chlorine in the electrode rinse water may be vented using an air blower coupled to the EDR feed tank 128. Vented hydrogen and chlorine vapors 198 may be fed to a gas scrubber 200. The gas scrubber 200 may use NaOH 150 (e.g., between approximately 3 wt % and approximately 5 wt % NaOH) to absorb the chlorine in the vapors 198, thereby converting the NaOH 150 into sodium hypochlorite (e.g., the oxidizing agent 186). At least a portion of the sodium hypochlorite may be routed to the EDR feed tank 128, as illustrated by arrow 202. The sodium hypochlorite (e.g., the oxidizing agent 186) that is not feed to the EDR feed tank 128 may be used in other system processes and/or collected as a commercial product.

Figure 3:
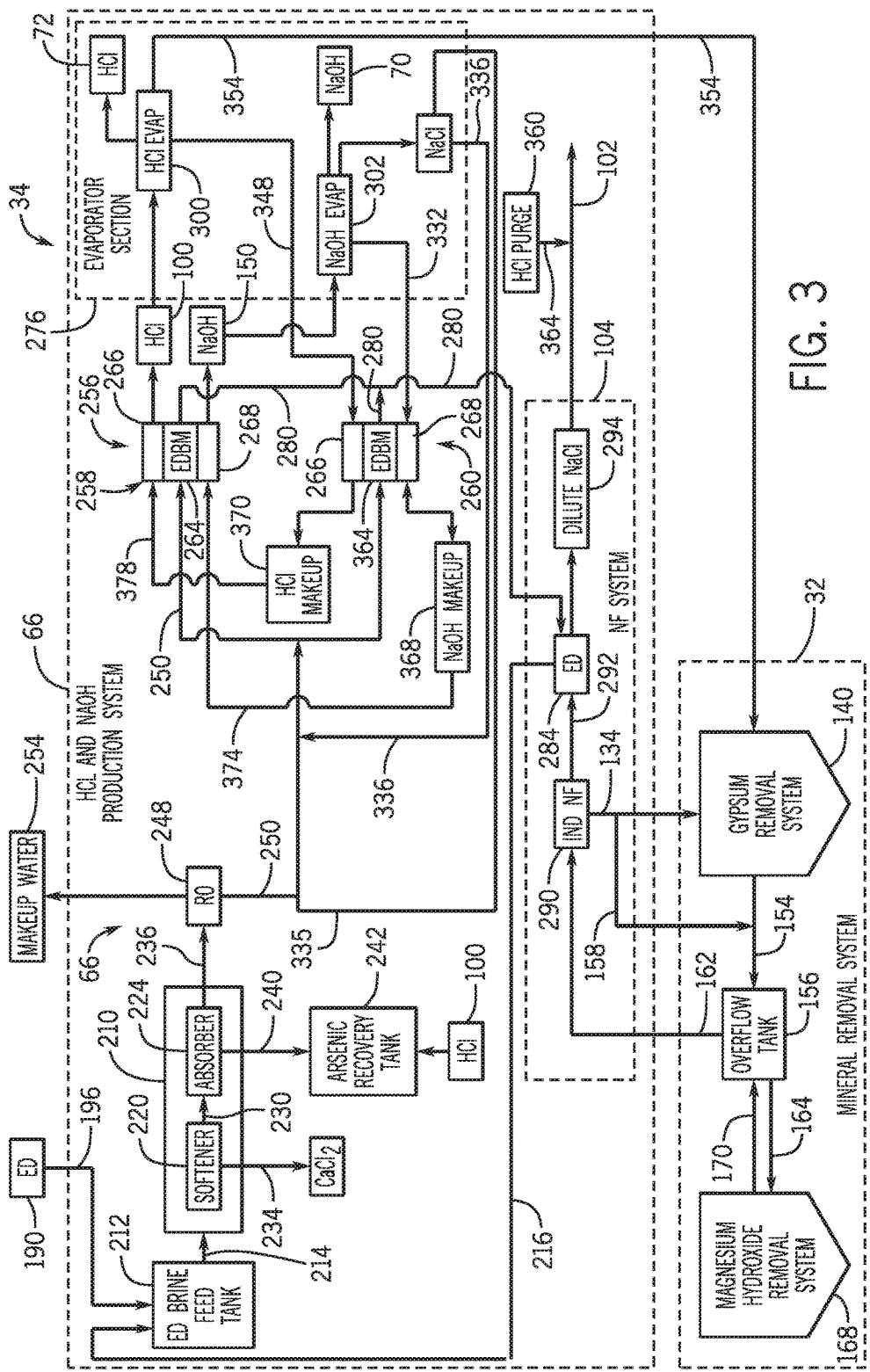
FIG. 3 is a block diagram of an embodiment of the mineral removal plant of FIG. 2, in which the HCl and NaOH production system includes a nanofiltration (NF) system, an electrodialysis (ED) system, and an evaporator section.

As discussed above, the HCl and NaOH production system 66 generates the HCl 72, 100 and NaOH 70, 150 from the first ED brine stream 196. FIG. 3 is a block diagram of an embodiment of the mineral removal plant 34 configured to generate the HCl 72, 100 and NaOH 70, 150 in the HCl and NaOH production system 66. To facilitate discussion of FIG. 3, certain features of the mineral removal plant 34 have been omitted. In the illustrated embodiment, the first ED brine stream 196 is fed to a multi-bed ion exchange system 210. The first ED system 190 may direct the first ED brine stream 196 to an ED brine feed tank 212 that provides the first ED brine stream 196 to the multi-bed ion exchange system 210, as illustrated by arrow 214. While in the ED brine feed tank 212, the first ED brine stream 196 may be mixed with a second ED brine stream 216 (having between approximately 4 wt % and approximately 7 wt % NaCl), which is generated in the first NF system 104.

The multi-bed ion exchange system 210 includes a first ion exchange softener 220 (e.g., such as an Amberlite™ IRC747 manufactured by The Dow Chemical Company of Midland, Mich.) and a first absorber 224. During operation, the first ion exchange softener 220 removes residual hardness compounds/elements (e.g., calcium and magnesium) from the stream 214 (e.g., ED brine streams 196, 216) that were not removed in the NF systems 104, 116. The first ion exchange softener 220 generates a first softened brine stream 230 and a calcium chloride ($CaCl_2$) brine 234. For example, the first ion exchange softener 220 includes a resin that absorbs divalent ions (e.g., calcium and magnesium), thereby removing the divalent ions from the stream 214. The first ion exchange softener 220 may be treated with HCl 100 (e.g., between approximately 5 wt % to approximately 8 wt % HCl) and NaOH 150 (e.g., between approximately 3 wt % and approximately 5 wt % NaOH) to regenerate the resin (e.g., release the absorbed calcium and magnesium), and generate the $CaCl_2$ brine 234. The $CaCl_2$ brine 234 may be sold as a commercial product. In certain embodiments, a portion of the first softened brine stream 230 may be used for rinsing the first ion exchange softener 220 between regeneration steps (e.g., between addition of the HCl 100 and NaOH 150). The resulting spent rinse brine may be directed to the ED brine feed tank 214. A pH of the spent rinse brine may be adjusted to between approximately 6 and approximately 8 using NaOH 150 before being fed to the ED brine feed tank 214.

The first softened brine stream 230 may have trace amounts of arsenate and silica. Accordingly, the first softened brine stream 230 is fed to the first absorber 224. As discussed above, the oxidizing agent 186 converts arsenic from the brine stream 30 to arsenate in the EDR feed tank 128. At a pH of approximately 5, the arsenate is ionized and the first ED system 190 removes the arsenate from the stream 192. As such, the first ED brine stream 196 may contain arsenate and silica. The first absorber 224 removes the residual arsenate and silica from the first softened brine stream 230. The first absorber 224 includes multiple ion exchange beds (such as Lewatit FO36 manufactured y Lanxess) that absorb the arsenate and silica from the first softened brine stream 230. In this way, the multi-bed ion exchange system 210 generates a second softened brine stream 236 that may be used to produce HCl 72, 100 and NaOH 70, 150. The first absorber 224 may be periodically regenerated with NaOH 150. The NaOH 150 reacts with the arsenate and silica to form sodium arsenate and sodium silicate rich brine 240. The brine 240 may be fed to an arsenic recovery tank 242. In the arsenic recovery tank 242, the brine 240 may be neutralized with HCl 100 and treated with ferric chloride ($FeCl_3$), thereby generating ferric arsenate, ferric silicate, and ferric hydroxide precipitate. The first absorber bed is operated at a pH of between approximately 5 and approximately 6 to maximize arsenic removal. A second absorber bed may be operated at a pH of between approximately 8 and approximately 9 (with NaOH stream 150 addition) to maximize silica removal. The brine from regeneration of the second bed, containing mainly sodium silicate, may be optionally fed to the gypsum removal system 140 to precipitate the silica with the gypsum as magnesium silicate, and reduce the volume of ferric arsenate solids.

The second softened brine stream 236 may be fed to a second RO system 248 (e.g., a seawater reverse osmosis system). The second RO system 248 concentrates the second softened brine stream 236, thereby generating a first sodium chloride (NaCl) brine stream 250. For example, the second softened brine stream 236 may have between approximately 5 wt % and approximately 7 wt % NaCl. The second RO system 248 may generate the first NaCl brine stream 250 (having approximately 8 wt % NaCl) and makeup water 254. The makeup water 254 may be used in various processes of the system 10. For example, the makeup water 254 may be used as cooling tower makeup and utility water for the system 10.

The first NaCl brine stream 250 may be directed to a NaCl feed tank that pumps the stream 250 to a second ED system 256. The second ED system 256 may include an electrodialysis bipolar membrane (EDBM) stack (e.g., Electromat Electrodialysis and Bipolar Electrodialysis manufactured by GE Power and Water of Trevose, Pa.) having a first EDBM 258 and a second EDBM 260. The EDBMs 258, 260 each have a brine compartment 264, an acid compartment 266, and a caustic compartment 268. During operation, the hydrogen ions ($H^+$) and chloride ions ($Cl^-$) accumulate in the acid compartment 266. Similarly, sodium ions ($Na^+$) and hydroxide ($OH^-$) accumulate in the caustic compartment 268. In this way, the compartments 266, 268 generate HCl 100 (having between approximately 4 wt % and approximately 8 wt % HCl) and NaOH 150 (having between approximately 4 wt % and approximately 8 wt % NaOH), respectively. The HCl 100 and NaOH 150 may be fed to an evaporator section 276 coupled to the second ED system 256 to generate concentrated HCl having between approximately 15 wt % and approximately 35 wt % HCl (e.g., the concentrated industrial grade HCl 72) and concentrated NaOH 150 having between approximately 20 wt % and approximately 50 wt % NaOH (e.g., the concentrated industrial grade NaOH 70), as discussed in further detail below. In addition, a portion of the HCl 100 and NaOH 150 may be used to adjust a pH of various streams and various compounds within the system 10.

A third ED brine stream 280 (having between approximately 3 wt % and approximately 5 wt % NaCl) from the brine compartment 264 of each EDBM 258, 260 may be fed to a third ED system 284 within the first NF system 104. The third ED brine stream 280 may be fed to a concentration region of the third ED system 284, thereby increasing a NaCl concentration of the second ED brine stream 216. For example, as discussed above, the first NF system 104 receives the first overflow portion 162 from the overflow tank 156. The first overflow portion 162 is fed to an NF unit 290 within the first NF system 104. The NF unit 290 removes residual calcium, magnesium, and sulfate from the first overflow portion 162, thereby generating the stream 158 and a fourth NF concentrated stream 292 (e.g., NaCl brine). The fourth NF concentrated stream 292 is fed (e.g., from a feed tank) to the third ED system 284. The third ED system 284 removes NaCl from the fourth NF concentrated stream 292 and generates a dilute NaCl 294 having approximately less than 1 wt % NaCl. The dilute NaCl 294 may be mixed with the HCl 100 (e.g., purge HCl from the evaporator section 276 having approximately 16 wt % HCl) to generate the stream 102. As discussed above, the brine stream 30 may be treated with HCl 100 (e.g., via stream 102) to convert bicarbonate to soluble $CO_2$ 180 upstream of the second NF system 116. In another embodiment, a third RO is used instead of the third ED system 284. Stream 292 is fed to the third RO, a third RO permeate is the dilute NaCl stream 294 and a third RO concentrate is mixed with stream 280 to produce stream 216.

The third ED system 284 generates an NaCl brine (e.g., the second ED brine stream 216) having between approximately 4 wt % and approximately 6 wt % NaCl. However, in certain embodiments, recirculation of the second ED brine stream 216 is avoided by feeding the third ED brine stream 280 to the concentrate side of the third ED system 284. The second ED brine stream 216 is fed to the ED brine feed tank 212 and recirculated through the second ED system 256 to facilitate production of the concentrated industrial grade HCl 72 and the concentrated industrial grade NaOH 70 in the evaporation section 276.

In the illustrated embodiment, the evaporator section 276 includes an HCl evaporator 300 and an NaOH evaporator 302. The evaporators 300, 302 concentrate the HCl stream 100 and the NaOH stream 150, respectively, thereby generating the concentrated industrial grade HCl 72 (between approximately 15 wt % to approximately 20 wt % HCl) and the concentrated industrial grade NaOH 70 (between approximately 30 wt % and approximately 50 wt % NaOH). As should be noted, a portion of the concentrated industrial grade HCl 72 and NaOH 70 may be diluted to generate the HCl 100 and NaOH 150. In certain embodiments, the HCl evaporator 300 is a mechanical vapor recompression (MVR) evaporator system and the NaOH evaporator 302 is a vacuum evaporator.

Figure 4:
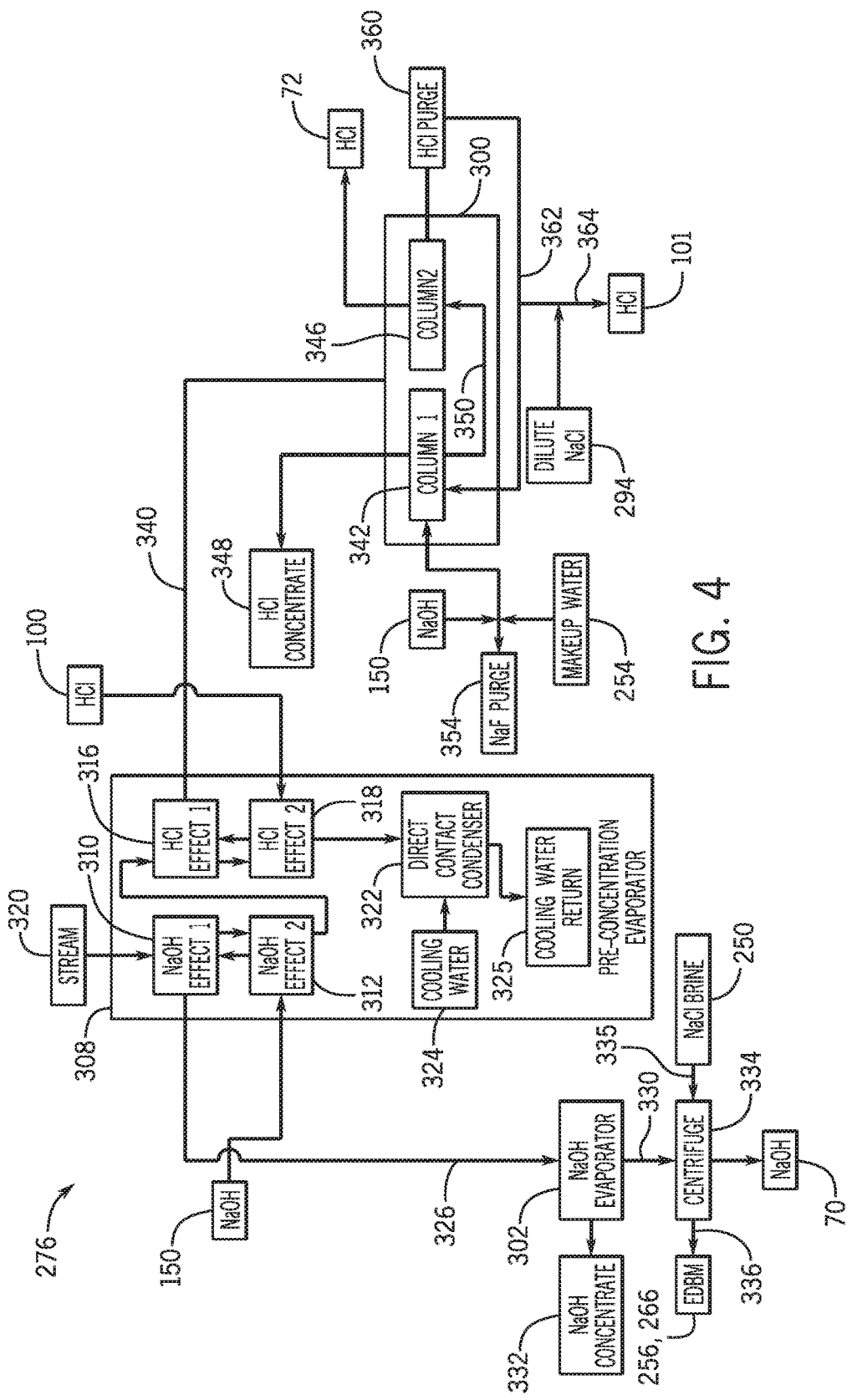
FIG. 4 is a block diagram of an embodiment of the evaporator section of FIG. 3, in which the evaporator section has a pre-concentration evaporator.

In other embodiments, the HCl evaporator 300 is a distillation unit and the NaOH evaporator 302 is a triple effect reverse flow evaporator. For example, FIG. 4 is an embodiment of the HCl and NaOH production system 66 that uses a distillation unit and a falling film evaporator to concentrate HCl and NaOH, thereby generating the concentrated industrial grade HCl 72 and the concentrated industrial grade NaOH 70. In the illustrated embodiment, the HCl 100 and NaOH 150 are fed to a pre-concentration evaporator 308 (e.g., a four effect falling film evaporator). The pre-concentration evaporator 308 includes a first NaOH effect 310, a second NaOH effect 312, a first HCl effect 316, and a second HCl effect 318. The NaOH 150 is fed to the second NaOH effect 312 followed by the first NaOH effect 310. Similarly, the HCl 100 is fed to the second HCl effect 318 followed by the first HCl effect 316. Steam 320 is fed to the first NaOH effect 310 and circulated through the effects 312, 316, and 318 to evaporate a portion of the water in the HCl 100 and NaOH 150, thereby pre-concentrating the NaOH and HCl. The steam 320 fed to the first NaOH effect 310 may be between approximately 690 kilopascals (kPa) (100 pounds per square inch (psi)) and approximately 1103 kPa (160 psi) and have a temperature of between approximately 160° C. (320° F.) and approximately 190° C. (375° F.). As the steam 320 flows through the effects 310, 312, 316, 318, the pressure of the steam 320 decreases to between approximately 413 kPa (60 psi) and approximately 7 kPa (1 psi), and the temperature of the steam 320 decreases to between approximately 150° C. (300° F.) and approximately 37° C. (100° F.). The steam 320 from the second HCl effect 318 is fed to a direct contact condenser 322, which uses cooling water stream 324 to condense the steam 320 and a small amount of HCl vapor (less than approximately 0.1 volume percent (vol %) in the steam 320) to produce a return cooling water stream 325 which contains the condensed steam and HCl. Accordingly, the pre-concentration evaporator 308 increases a concentration of the NaOH 150 from approximately 7 wt % NaOH to approximately 15 wt % NaOH, and a concentration of the HCl 100 from approximately 7 wt % HCl to approximately 15 wt % HCl. The reverse flow of the HCl 100 and NaOH 150, compared to the flow of steam 320, decreases NaOH viscosity, decreases HCl loss to cooling water (e.g., the vapor from the lowest concentration HCl effect (the second HCl effect 318) is directed to the direct contact condenser 322), and may reduce flashing in a feed distributor of the pre-concentration evaporator 308. A vacuum pump (e.g., a liquid ring vacuum pump) may be used to remove non-condensable components from the direct contact condenser 322. In certain embodiments, hot condensate from the pre-concentration evaporator may be used to pre-heat the NaOH 150. The condensate may then be fed to a cooler and recycled to through the HCl and NaOH production system 66.

Following pre-concentration, the first NaOH effect 310 feeds a pre-concentrated NaOH stream 326 to the NaOH evaporator 302, in which the NaOH is concentrated to produce a concentrated NaOH stream 330 having approximately 40 wt % to approximately 50 wt % NaOH and an NaOH condensate 332. The NaOH condensate 332 may be recycled throughout the HCl and NaOH production system 66 (e.g., fed to the second ED system 256), as discussed below. Similar to the pre-concentration evaporator 308, the NaOH evaporator 302 may also be a reverse flow multi-effect evaporator. The NaOH evaporator 302 may operate similar to the pre-concentration evaporator 308 with regard to the effects 310, 312, discussed above. The concentrated NaOH stream 330 may have solid NaCl that may have precipitated during concentration (evaporation) of the stream 326. Therefore, the NaOH evaporator 302 may feed the concentrated NaOH stream 330 to a centrifuge 334. The centrifuge 334 removes the precipitated NaCl and generates the concentrated industrial grade NaOH 70. A portion 335 of the first NaCl brine stream 250 from the second RO 248 may be used to redissolved the salt removed by the centrifuge 334, thereby removing the precipitated NaCl and generating a centrifuge NaCl brine stream 336. The centrifuge NaCl brine stream 336 may be combined with the stream 250 and recycled through the second ED system 256. (See FIG. 3)

The first HCl effect 316 feeds a pre-concentrated HCl stream 340 to the HCl evaporator 300. The HCl evaporator 300 may be a multi-column distillation unit. For example, in the illustrated embodiment, the HCl evaporator 300 includes a first distillation column 342 and a second distillation column 346. The columns 342, 346 may operate at different pressures to facilitate separation of HCl that forms an azeotrope with water during distillation (e.g., HCl concentration of approximately 15 wt % to approximately 20 wt %). For example, the first distillation column 342 may be a vacuum column operating at between approximately 13 kPa (2 psi) and approximately 27 kPa (4 psi), and the second distillation column 346 may operate at between approximately 345 kPa (50 psi) and approximately 485 kPa (70 psi).

A reboiler may be used to vaporize the water and HCl at the bottom of the columns 342, 346. The first distillation column 342 generates HCl condensate 348 (between approximately 0.01 wt % and approximately 0.1 wt % HCl) and a concentrated HCl stream 350 (between approximately 20 wt % and approximately 30 wt % HCl). The HCl condensate 348 may be recycled throughout the HCl and NaOH production system 66 (e.g., fed to the second ED system 256), as discussed below. Non-condensable materials (e.g., air and hydrofluoric acid (HF)) in the stream 340 may be removed by a vacuum pump (e.g., a liquid ring vacuum pump). Makeup water 254 and NaOH 150 (e.g., approximately 4 wt % NaOH) may be mixed with the non-condensable materials to generated a sodium fluoride purge stream 354. The sodium fluoride purge stream 354 may be directed to the gypsum removal system 140, as illustrated in FIG. 3. The NaF in the purge stream 354 may react with soluble calcium (e.g., calcium that has not precipitated) in the gypsum removal system 140 to form calcium fluoride ($CaF_2$) on the gypsum crystals, thereby removing fluoride from the brine stream 30.

The concentrated HCl stream 350 is fed to the second distillation column 346 to generate the HCl 72 having approximately 35 wt % HCl. In addition, the second distillation column 346 generates an HCl purge 360 (containing between approximately 5 wt % and approximately 15 wt % HCl), which is recycled to the first distillation column 342, as illustrated by arrow 362. A portion 364 of the HCl purge 360 is removed from the recycled stream 362 to purge non-volatile salt (NaCl and $NaHSO_4$) impurities in the HCl purge 360, which may precipitate out in the second distillation column 346. The portion 364 may be directed toward the third ED system 284 and combined with the dilute NaCl 294 (see FIGS. 2 and 3).

Returning to FIG. 3, the NaOH condensate 332 from the NaOH evaporator 302 is fed to the caustic compartment 268 of the second EDBM unit 260. Similarly, the HCl condensate 348 is fed to the acid compartment 266 of the second EDBM unit 260. The condensates 332, 348 generate NaOH makeup 368 and HCl makeup 370, respectively. The NaOH makeup 368 and the HCl makeup 370 are fed to their respective compartments (e.g., the caustic compartment 268 and acid compartment 266) in the first EDBM unit 268, as illustrated by arrows 374, 378. In this way, the first EDBM unit 268 generates the HCl 100 and NaOH 150.

Present embodiments also include a waste water treatment system, e.g. the system 10, which uses a softener to remove hardness compounds (e.g., calcium and magnesium) from the brine stream 30 upstream of the mineral removal system 32. For example, FIG. 5 is a block diagram of an embodiment of the mineral removal plant 34 configured to reduce the salinity of the brine stream 30. As previously described, the mineral removal system 32 receives the brine stream 30 from the first RO system 20. As may be appreciated, the brine stream 30 may contain various hardness elements and/or compounds. For example, the brine stream 30 may contain various salts and minerals such as, but not limited to, NaCl, $SO_4$, Ca, Mg, and/or $Si_{O2}$. In certain embodiments, the brine stream 30 may contain approximately 3.0 g/L (3,000 ppm) to approximately 8.0 g/L (8,000 ppm) NaCl, approximately 3.0 g/L (3,000 ppm) to approximately 8.0 g/L (8,000 ppm) $SO_4$, approximately 0.1 g/L (100 ppm) to approximately 0.4 g/L (400 ppm) Mg, approximately 0.2 g/L (200 ppm) to approximately 0.6 g/L (600 ppm) Ca, and/or approximately 0.05 g/L (50 ppm) to approximately 0.2 g/L (200 ppm) $SiO_2$. Furthermore, in certain embodiments, the brine stream 30 may have a pH range between approximately 4 and approximately 8. For example, the brine stream 30 may have a pH of approximately 6.

In the illustrated embodiment, the brine stream 30 flows through a second ion exchange softener 386 (e.g., such as an Amberlite™ IRC747 manufactured by The Dow Chemical Company of Midland, Mich.) where a substantial portion (e.g., approximately greater than 99%) of hardness minerals are removed. For example, the second ion exchange softener 386 removes divalent cations (e.g., $Ca^{2+}$, $Mg^{2+}$, $Fe^{2+}$, $Mn^{2+}$, $Sr^{2+}$, and $Ba^{2+}$) from the brine stream 30, thereby reducing a hardness of the brine stream 30. In operation, a resin within the second ion exchange softener 386 absorbs the divalent ions from the brine stream 30 to generate a third softened brine stream 388. The third softened brine stream 388 may have approximately less than 0.015 g/L (15 ppm) of Ca, Mg, Sr, and Ba. Iron (Fe) and manganese (Mn) in the brine stream 30 are kept in a reduced divalent state (e.g., Fe(II) and Mn(II)) such that they may be removed as dissolved species without scaling of the softener resin. The brine stream 30 may also contain bicarbonate ($HCO_3$). As discussed below, the second ion exchange softener 386 may convert the bicarbonate to the $CO_2$ 180. The $CO_2$ 180 may be removed in the air stripper 178 downstream from the third ion exchange softener 388, thereby generating a degassed softened brine stream 390. In certain embodiments, multiple stages are used in the air stripper 178 to enable a low $CO_2$ residual (e.g., less than approximately 2 ppm $CO_2$). A low $CO_2$ residual may inhibit carbonate reformation and scaling when a pH of the third softened brine stream 388 increases during the various downstream brine treatment steps. The degassed softened brine stream 390 is desalinated to generate the desalinated water 28, as discussed in detail below.

Prior to degassing, the third softened brine 388 may be heated with the heat exchanger 96 to between approximately 32° C. (90° F.) and approximately 50° C. (122° F.). The heat exchanger 96 may use vacuum vapors from a caustic evaporator within the HCl and NaOH production system 66 to heat the third softened brine 388. In certain embodiments, the third softened brine 388 may be mixed with the HCl 100 (e.g., between approximately 6 wt % and approximately 8 wt % HCl) upstream of the air stripper 178 and downstream from the heat exchanger 96. The HCl 100 may decrease a pH of the third softened brine 388 to less than approximately 4, thereby converting any residual bicarbonate to $CO_2$. As should be noted, the HCl 100 may be generated by the HCl and NaOH production system 66.

During softening of the brine stream 30, the second ion exchange softener 386 may become saturated with the divalent ions (e.g., hardness minerals). Accordingly, the second ion exchange softener 386 may be treated with the HCl 100 to remove the absorbed divalent ions from the softener resin, thereby regenerating the softener resin. Treatment of the second ion exchange softener 386 with the HCl 100 generates a softener chloride brine stream 392, which includes the hardness and divalent ions(e.g., $Ca^{2+}$, $Mg^{2+}$, $Fe^{2+}$, $Mn^{2+}$, $Sr^{2+}$, $Ba^{2+}$, and $SO_4^{2-}$) and sodium chloride (NaCl). The softener chloride brine stream 392 is fed to the mineral removal system 32 for mineral removal, as discussed in detail below. In addition to adding the HCl 100, the second ion exchange softener 386 may be treated with the NaOH 150 (e.g., between approximately 0.1 wt % and approximately 4 wt %). The NaOH 150 may neutralize at least a portion of the second ion exchange softener 386 after regeneration (e.g., removal of hardness divalent species) of the softener resin with the HCl 100. For example, the NaOH 150 neutralizes the resin by converting a portion of the softener resin from an acid form ($H^+$) 393 to a sodium form ($Na^+$) 394. Therefore, in certain embodiments, the softener resin may be in both the acid and sodium (e.g., neutral) forms 393, 394, respectively. The sodium form 394 may remove the hardness and divalent ion species from the brine stream 30 via ion exchange between the Na and the divalent elements (e.g., Ca and Mg), while the acid form 393 may convert the bicarbonate in the brine stream 30 to the $CO_2$ 180. As such, additional HCl 100 may not need to be added downstream of the second ion exchange softener 386 for removal of the bicarbonate.

A concentration of the NaOH 150 may be adjusted based, at least in part, on an amount of bicarbonate in the brine stream 30. For example, if the concentration of the bicarbonate in the brine stream 30 is high (e.g., greater than approximately 200 mg/L (200 ppm)), the concentration of the NaOH 150 may be decreased such that less of the softener resin is neutralized. That is, by adding less concentrated NaOH 150 to the second ion exchange softener 386, less of the acid form 393 of the resin may be neutralized to the sodium form 394. Therefore, more acid may be available in the softener resin to convert the bicarbonate to $CO_2$ in brine streams having a high concentration of bicarbonate. Similarly, if the bicarbonate concentration is low (e.g., less than approximately 50 mg/L (50 ppm)), a higher concentration of NaOH 150 (e.g., between approximately 4 wt % and 5 wt %) or a higher flow may be used to neutralize a larger portion of the softener resin. Effluent generated from the neutralization of the second ion exchange softener 386 is essentially desalinated water. For example, the sodium ions in the NaOH 150 are absorbed by the softener resin and the hydroxide ions ($OH^-$) in the NaOH 150 react with the acid ($H^+$) in the softener resin to generate desalinated water effluent (e.g., the one or more desalinated water streams 36). The desalinated water effluent may be combined with the desalinated water stream 28.

As discussed above, the degassed softened brine stream 390 is desalinated to produce the desalinated water 28. While the hardness and divalent scale forming compounds/elements are removed, the degassed softened brine stream 390 may still contain impurities and other scale forming compounds such as silica ($SiO_2$) and sodium sulfate ($Na_2SO_4$). In contrast to the embodiment in FIG. 2, the second NF system 116 in this particular embodiment is downstream of the air stripper 178. Accordingly, the degassed softened brine stream 390 is routed to the second NF system 116 that removes one or more of the other scale producing species (e.g., $SO_4$) from the degassed softened brine stream 390. The degassed softened brine stream 390 may be mixed with the anti-scalant 108 upstream of the first NF unit 120. The anti-scalant 108 may mitigate precipitation of silica in the degassed softened brine stream 390. Non limiting examples of the anti-scalant 108 include phosphonates such as 1-hydroxyethylidene 1,1-diphosphonic acid (HEDP) or other proprietary silica antiscalants formulations Vitec 4000 (Avista Technologies Inc), Genesys SI (Genesys International Ltd). Additionally, in certain embodiments the NaOH 150 may be added to the degassed softened brine stream 390. The NaOH 150 adjusts a pH of the degassed softened brine stream 390 to above approximately 4. For example, the NaOH 150 may increase the pH of the degassed softened brine 390 to between approximately 4 and approximately 7. The pH increase may cause precipitation of certain compounds within the degassed softened brine 390. Therefore, the degassed softened brine 390 may be filtered before feeding to the second NF system 116. For example, the degassed softened brine 390 may be filtered through the first filter 110. The first filter 110 may remove the precipitated solids (e.g., iron hydroxide) formed during pH adjustment of the degassed softened brine 390. In certain embodiments, the first filter 110 may be a 2-8 micron filter cartridge. However, any other suitable filter size may be used to remove the solids.

The second NF system 116 may include 2 to 4 stages of reverse osmosis and nanofiltration membranes that remove the sulfate from the degassed softened brine stream 390, as discussed above. Accordingly, the second NF system 116 may generate a first softened NF permeate stream 396 having less than approximately 20% sulfate. A first softened NF non-permeate stream 398 may be routed to the mineral removal system 32, as discussed in detail below. The first softened NF permeate stream 396 may include approximately 80% or more of silica and chloride, and residual sulfate. Therefore, the first softened NF permeate stream 396 is routed to the first ED system 190 for removal of the chlorides and residual sulfate, thereby generating the desalinated water 28. The desalinated water 28 includes most of the silica (e.g., greater than approximately 80%) from the brine stream 30.

In addition to having chlorides and residual sulfate, the first softened NF permeate stream 396 may also include arsenic (As). For example, as discussed above, the brine stream 30 may have dissolved arsenic due to brackish groundwater treatment upstream of the mineral removal system 32. The NF unit 116 does not remove the dissolved arsenic. Therefore, to meet drinking water standards, the first softened NF permeate stream 396 may be treated with the oxidizing agent 186, e.g., sodium hypochlorite or other suitable oxidant. In certain embodiments, the oxidizing agent 186 may be added to the degassed softened brine stream 390 upstream from the first NF system 116. The oxidizing agent 186 oxidizes the arsenic and generates arsenate ($H_2AsO_4^-$). Depending on the pH of the softened NF permeate stream 396, the pH may be adjusted with either HCl 100 or NaOH 150 such that the first softened NF permeate stream 396 has a pH of approximately 5. At pH 5, arsenate is in ionic form (e.g., $AsO_4^{3-}$). Therefore, arsenate, in the ionic form, may be removed by the first ED system 190. The first ED brine stream 196 may be routed to the mineral removal system 32 (e.g., as a makeup water stream) via the HCl and NaOH production system 66, where it is separated into the HCl product stream 72, the NaOH product stream 70, a purge sodium sulfate sodium chloride stream 399 and desalinated water streams 400 and 401. Stream 400 decreases the concentration of NaCl and $SO_4$ in the first ED brine stream 196. By removing the hardness and divalent compounds/elements in the brine stream 30 before the stream 30 is fed to the NF system 116, the ED system 190 may utilize non-selective membranes to generate the desalinated water streams 36. The non-selective membranes generally have a lower cost compared to ion selective membranes (e.g., monovalent selective membranes). Therefore, the overall operational and maintenance costs of the system 10 may be decreased, as compared to systems that employ ion selective membranes throughout the system and do not have a softener (e.g., the first ion exchange softener 386).

As discussed above, the mineral removal system 32 receives the softener brine stream 392, the first softened NF non-permeate stream 398, the purge sodium sulfate sodium chloride steam 399 and the desalinated water stream 401. The mineral removal system 32 removes minerals (e.g., hardness and divalent compounds/elements, chlorine salts, and sulfate) from the respective streams 392, 398, and 401, thereby generating the gypsum 46, magnesium 54, and other compounds (e.g., salt 50, bromine 58, and potash 62). For example, in the illustrated embodiment, the stream 392 is directed to the magnesium hydroxide removal system 168. During operation, the magnesium hydroxide removal system 168 is configured to recover Mg in the form of magnesium hydroxide 54. The stream 392 may be treated with caustic (e.g., the NaOH 150) and the oxidizing agent 186 upstream of the magnesium hydroxide removal system 168. The oxidizing agent 186 oxidizes the iron species $Fe^{2+}$ to $Fe^{3+}$. The NaOH 150 adjusts a pH of the stream 392 to between approximately 5 and approximately 7, which enables formation and precipitation of ferric hydroxide ($Fe(OH)_3$). The ferric hydroxide may be removed by filtering the stream 392 through a third filter 404.

In certain embodiments, the filtered stream 392 may be treated with additional caustic to increase the pH to between approximately 8 and approximately 10, thereby precipitating manganese and generating industrial grade manganese. In other embodiments, both the manganese and iron may be precipitated in a single step by adjusting the pH of the stream 392 before filtration to between approximately 8 and approximately 10, rather before filtering in the third filter 404. Rather than in a two step process, e.g., first adjusting the pH to between approximately 5 and approximately 7 to precipitate the ferric hydroxide before filtering the stream 392 in the third filter 404, followed by adjusting the pH to between approximately 8 and approximately 10 after filtering the stream 392 in the third filter 404 to precipitate manganese.

The third filter 404 may be regenerated periodically by adding HCl 100 (e.g., between approximately 5 wt % and approximately 20 wt % HCl). The HCl 100 dissolves the iron and manganese, thereby regenerating the third filter 404. Acidified filter effluent 406 containing the dissolved iron, and, in certain embodiments, manganese, may be fed to a gypsum removal system 140. The acidified filter effluent 406 may be used as a coagulant in the gypsum removal system 140 or may be concentrated and sold as a commercial coagulant. A filtered brine stream 408 is routed to the magnesium hydroxide removal system 168. While in the magnesium hydroxide removal system 168, the filtered brine stream 408 is treated with lime 40 or between approximately 7 wt % and 12 wt % caustic (e.g., NaOH 150) from the HCl and NaOH production system 66. For example, the filtered brine stream 408 may be treated with the lime 40 when a $Ca/SO_4$ molar ratio in the filtered brine stream 408 is less than approximately 1. That is, when a concentration of $SO_4$ in the filtered brine stream 408 is more than a concentration of Ca. In contrast, when the $Ca/SO_4$ molar ratio in the filtered brine stream 408 is greater than approximately 1, the filtered brine stream 408 may be treated with NaOH 150. The lime 40 and NaOH 150 enable precipitation of $Mg(OH)_2$ 54, thereby recovering the $Mg(OH)_2$ 54 (between approximately 50 wt % to approximately 70 wt % $Mg(OH)_2$) and from the brine stream 30. The $Mg(OH)_2$ 54 recovered may be sold an industrial grade product.

Following magnesium recovery in the magnesium hydroxide removal system 168, an effluent brine stream 412 is directed to the gypsum removal system 140. The gypsum removal system 140 recovers the Ca and $SO_4$ from effluent brine stream 412 to generate the gypsum 46. In embodiments in which the $Ca/SO_4$ ratio is greater than 1, the effluent brine stream 412 may be treated with the HCl 100 (between approximately 6 wt % and approximately 8 wt % HCl) to adjust a pH of the effluent brine stream 412 to between approximately 7 and approximately 8. At least a portion of the pH adjusted effluent brine stream 412 is fed to a fourth ED system 414. The fourth ED unit 414 may extract a portion of the calcium in the effluent brine stream 412, thereby generating calcium chloride ($CaCl_2$) brine 234 having between approximately 15 wt % and approximately 35 wt % $CaCl_2$. The $CaCl_2$ brine 234 may be made available as a commercial product. An ED diluate stream 418 containing the remaining calcium chloride sodium sulfate and sodium chloride is fed to the gypsum removal system 140 for removal of Ca and $SO_4$ to generate the gypsum 46.

The gypsum removal system 140 may include the mixer 142, the settler 146, and the second filter 148 that facilitate removal of the gypsum 46 from the brine stream (e.g., the ED permeate stream 418). In certain embodiments, the stream 418 may be treated with the oxidizing agent 186 to convert any residual arsenic to arsenate, as discussed above, upstream of the gypsum removal system 140. The Ca and $SO_4$ in the stream 418 react in the gypsum removal system 140 to precipitate the gypsum 46. In certain embodiments, approximately 50% to approximately 70% of the $SO_4$ is removed from the stream 418. The presence of gypsum 46 seed crystals in the mixer 142 (e.g., a turbulent mixer) operating at a neutral pH (e.g., a pH of approximately 6 to approximately 8) may facilitate gypsum 46 precipitation kinetics, thereby enabling rapid gypsum precipitation. The gypsum 54 particles may form a suspension and, therefore, may be well mixed with the water. Accordingly, while in the mixer 142, the stream 418 may be treated with the acidified filter effluent 406 to coagulate (clump) the gypsum 46 particles, and facilitate separation of the gypsum particles from the water. For example, as discussed above, the acidified filter effluent 406 includes ferric hydroxide, which may be used as a coagulant.

In addition to gypsum precipitation, insoluble calcium fluoride ($CaF_2$) also precipitates in the mixer 142 thereby removing a substantial portion of the fluoride from the stream 418; thereby reducing fluoride scaling in downstream ED systems. In the settler 146, the gypsum crystals settle, and the saturated near solids free solution is decanted off. A small amount of softened salt brine 419 is recycled to the settler overflow to increase gypsum solubility and to desaturate the brine stream, thereby reducing scaling in the downstream units. The settler bottoms may be routed to a hydroclone and the second filter 148 to wash (e.g., with desalinated product water) and concentrate the gypsum 46 into a saleable washed filter cake. In certain embodiments, the filter cake may include approximately 70 wt % to approximately 100 wt % gypsum 46. For example, the filter cake may include approximately 90 wt % gypsum 46. Thus, gypsum 46 is provided as the output 160 from the gypsum removal system 160. The fine solids overflow stream from the hydroclone is recycled to the mixer 142 as seed crystals. The filtrate from the second filter 148 is recycled to the settler 142. In certain embodiments, effluent from the settler 146 is treated with sodium bisulfate ($NaHSO_4$) to remove any residual oxidizing agent 186. For example, the $NaHSO_4$ may react with sodium hypochlorite to produce $SO_4$ and chloride.

The gypsum removal system 140 may remove approximately 60% to approximately 75% of the calcium received from the stream 418 as gypsum 46, and produce a second NaCl brine stream 420. The second NaCl brine stream 420 also includes the $SO_4$ and chloride generated during treatment of the filtrate from the second filter 148 and the effluent from the settler 146 with $NaHSO_4$. The second NaCl brine stream 420 may also include residual magnesium and calcium that were not removed in the removal systems 140, 168. For example, the second NaCl brine stream 420 may contain less than approximately 5-9 g/L gypsum 54 and less than approximately 0.4 g/L magnesium chloride. Therefore, the brine stream 420 is fed to a third ion exchange softener 424 before routing to an anti-scalant recovery ED system 428 within the mineral removal system 32. Similar to the softeners 220,386, the third ion exchange softener 424 removes the residual magnesium and calcium from the brine stream 420, thereby generating a fourth softened brine stream 430. In this way, ion selective electrodialysis membranes generally used in electrodialysis systems may be replace with more cost efficient non-selective ED membranes. The third ion exchange softener 424 is treated with HCl 100 and NaOH 150 and a chloride brine stream 432 (e.g., $CaCl_2$, $MgCl_2$) is produced and combined with the stream 408 downstream from the third filter 404 to facilitate recovery of the calcium and magnesium.

The fourth softened brine stream 430 and the sodium sulfate and sodium chloride purge stream 399 from the HCl and NaOH production system 66 is directed to a third NF system 436. The third NF system 436 enables removal of sulfate from the fourth softened brine stream 430, and generates a second softened NF permeate stream 438 having greater than approximately 40 g/L NaCl and a second softened NF non-permeate stream 440. The second softened NF non-permeate stream 440 may include between approximately 50 g/L and 70 g/L total dissolved solids, which include Ca and $SO_4$. Therefore, the second softened NF non-permeate stream 440 is directed to the gypsum removal system 140 to recover the Ca and $SO_4$ as the gypsum 46. In certain embodiments, the fourth softened brine stream 430 may be combined with the first softened NF non-permeate stream 398 upstream of the third NF system 436. The streams 398, 430 may be neutralized with HCl 100 (between approximately 5% wt % and approximately 8 wt % HCl) and filtered with a fourth filter 442 (similar to the filters 110, 404) before being fed to the third NF system 436. The fourth filter 442 may substantially block gypsum scale from passing to the third NF system 436. In certain embodiments, a portion of the fourth softened brine stream 430 may be recycled to the gypsum settler 146. The recycled brine may desaturate effluent from the settler 146 and reduce gypsum scaling in the gypsum recovery system 140.

In addition to having a high concentration of NaCl, the fourth softener effluent stream 430 also includes the anti-scalant 108. It may be desirable to recover and recycle the anti-scalant 108 used throughout the system 10. Recovering and recycling the anti-scalant 108 may decrease the overall operational costs of the system 10 by decreasing costs associated with the purchase of the anti-scalant 108. Accordingly a portion 446 of the fourth softener effluent stream 430, the second softened NF permeate stream 438 and desalinated water stream 401 is routed to the anti-scalant recovery ED system 428 for recovery of the anti-sealant 108. In the illustrated embodiment, the anti-sealant recovery ED system 428 includes a first stage ED unit 448, a second stage ED unit 450, and a third stage ED unit 452. However, as should be appreciated, the anti-sealant recovery ED system 428 may include more or fewer stages. For example, the anti-sealant recovery ED system 428 may include one, two, three, four, five, or more ED stages. The ED units 448, 450, and 452 may use cation and anion selective membranes or non-selective membranes for remove residual arsenate, calcium, and magnesium from the second softened NF permeate stream 438. For example, the second softened NF permeate stream 438 is fed to a concentrate side and the portion 401 of the softener effluent stream 430 is fed to a diluate side of the first stage ED unit 448, and the first stage ED unit 448 extracts sodium chloride (NaCl) and residual arsenate from the portion 401 of the softener effluent stream 430 into the second softened NF permeate stream 438. The first stage ED unit 448 may operate at a pH of approximately 4 to approximately 7. The higher pH enables ionization of the arsenic to generate arsenate, thereby facilitating removal of arsenic from the second softened NF permeate stream 438. At the operational pH of the first stage ED unit 448, silica in the second softened NF permeate stream 438 is non-ionic. Therefore, the first stage ED unit 448 may not remove silica. As such, a first stage ED concentrate stream 456 may include approximately less than 100 ppm silica.

A first stage ED diluate stream 458 having the anti-sealant 108 is fed to the second stage ED unit 450. The first stage ED concentrate stream 456 is directed to the HCl and NaOH production system 66 and used for production of HCl and NaOH (e.g., the HCl 72, 100 and NaOH 70, 150), as discussed in detail below with reference to FIG. 6. In certain embodiments, a pH of the first stage ED diluate stream 458 may be adjusted by adding HCl 100 (between approximately 6 wt % and approximately 8 wt % HCl). For example, the pH of the first stage ED diluate stream 458 may be decreased to less than approximately 3. In this way, ferric chloride (Fe(III)Cl$_3$) added upstream of the second softener 192 may be released from the anti-sealant 108, and the anti-sealant 108 may be recovered in the third stage ED unit 452.

The first stage ED diluate stream 458 includes chloride salts such as, but not limited to, calcium chloride, magnesium chloride, iron chloride, and others. The second stage ED unit 450 (e.g., mixed chloride extraction ED) extracts a substantial portion (e.g., approximately 65% to 80%) of the magnesium chloride, calcium chloride, and sodium chloride from the first stage ED diluate stream 458 using anionic monovalent permselective membranes to produce a second stage ED dilute stream 460 and a second stage ED concentrate stream 462. The stream 462 may be concentrated with magnesium chloride, calcium chloride, and sodium chloride brine (e.g., approximately 3 to 25 wt %). The second stage ED concentrate stream 462 may be combined with the softener brine stream 392 and recycled back through the removal systems 140, 168. Because the second stage ED concentrate stream 462 may have an increased concentration of calcium and magnesium, makeup water from the HCl and NaOH production system 66 may be fed to the second stage ED unit 450, as indicated by arrow 400, to dilute the second stage ED concentrate stream 462 and mitigate scaling in the systems 140, 168.

The third stage ED unit 452 receives the second stage ED concentrate stream 460 and uses non-selective membranes to remove residual Na$_2$SO$_4$ from the second stage concentrate stream 460 and recover the anti-scalant 108. Similar to the second stage ED unit 450, the third stage ED unit 452 may also receive makeup water 400 from the HCl and NaOH production system 66 to dilute sodium sulfate brine 468 output from the third stage ED unit 452. The third stage ED unit 452 directs the sodium sulfate brine 468 to the gypsum removal system 140. The third ED unit 452 also generates a regenerated anti-scalant stream 454. The regenerated anti-scalant stream 454 may be directed to various streams and/or components of the system 10 such that the anti-scalant 108 may be re-used by the system 10 (e.g., in the NF systems 116, 436). In certain embodiments, the regenerated anti-scalant 108 may be provided as an industrial grade commercial product.

FIG. 6 is an embodiment of the HCl and NaOH production system 66 that may be used by the mineral removal plant 34 to generate HCl and NaOH (e.g., the HCl 72, 100 and NaOH 70, 150). As discussed above, the HCl and NaOH production system 66 receives the streams 196, 456 from the ED systems 190, 468. The HCl and NaOH production system 66 includes the first absorber 224 that receives the first ED brine stream 196. As discussed above, the first ED brine stream 196 may include arsenic. The first absorber 224 may remove arsenic from the first ED brine stream 146. Prior to feeding the first ED brine stream 196 to the first absorber 224, the stream 196 may be treated with sodium bisulfate (NaHSO$_3$). The sodium bisulfate reacts with residual oxidizing agent 186 that was used to oxidize arsenic upstream of the second NF system 116. For example, the reaction of sodium bisulfate and the residual oxidizing agent 186 (e.g., sodium hypochlorite) produces non-oxidizing chloride and sulfate species, thereby blocking oxidation of downstream ion exchange resins and membranes by the residual oxidizing agent 186. The first absorber 224 may use disposable single-use absorbents (e.g., for low arsenic content brines) or regenerable absorbents (e.g., for high arsenic content brines). In embodiments, in which the first absorber 224 uses regenerable absorbents, the absorbent may be periodically regenerated with the NaOH 150 and NaCl brine (e.g., from the first stage ED concentrate 456). A first arsenic-rich stream 472 may be mixed with a ferric chloride solution (FeCl$_3$) to generate ferric arsenate. The ferric arsenate may be removed from the first arsenic-rich brine stream 472 with a fifth filter 476, thereby generating a filtered arsenic lean stream 478. The filtered arsenic lean stream 478 is greater than approximately 98% NaCl. The filtered arsenic lean stream 478 is recycled back through the first absorber 224, which removes additional arsenic from the regenerable absorbent.

A first absorber concentrated brine stream 480 is fed to a fourth NF system 482, which removes greater than approximately 90% residual sulfate, greater than approximately 75% residual calcium and magnesium, and less than approximately 25% of chloride from the first absorber concentrated brine stream 480. The fourth NF system 482 may include at least 2 NF stages. A third NF permeate stream 484 is fed to the second RO system 248 and a third NF non-permeate stream 486 is directed to the mineral removal system 32. The third NF non-permeate stream 486 includes the residual sulfate, calcium, magnesium, and chloride from the first ED brine stream 196, which are recovered as gypsum 46 and Mg(OH)$_2$ 54 in the mineral removal system 32. In certain embodiments, the third NF non-permeate stream 486 is mixed with the fourth softened brine stream 430 upstream of the third NF system 436. In other embodiments, the third NF non-permeate 486 is fed to the anti-scalant recovery ED system 428.

The third NF permeate stream 484 has a low sulfate content (e.g., approximately 0.1-0.5 g/L (100-500 ppm)) and more than approximately 3% chloride (e.g., approximately 40 g/L (40,000 ppm) to 60 g/L (60,000 ppm) NaCl). As such, the third NF permeate stream 484 may be used to produce the HCl 72, 100 and the NaOH 70, 150. For example, the second RO system 248 separates the third NF permeate stream 484 into the first NaCl brine stream 250 (e.g., having between approximately 75 g/L and approximately 115 g/L NaCl) and the makeup water 254 (e.g., a low salinity RO permeate stream having less than approximately 1 g/L (100 ppm) NaCl). The NaCl in the first NaCl brine stream 250 is high purity NaCl having greater than approximately 99 wt % NaCl. Therefore, the first NaCl brine stream 250 may be used to generate NSF 60 certified caustic (e.g., the NaOH 70, 150) and HCl (e.g., the HCl 72, 100), according to the National Sanitation Foundation (NSF) Standard 60 (NSF 60). Because the system 10 is configured to generate NSF 60 certified NaOH and HCl during operation, costs associated with the purchase of NSF 60 certified NaOH and HCl may be reduced.

The makeup water 254 (e.g., makeup water 399, 400) may be used for several processes within the system 10. For example, in one embodiment, the makeup water 254 may be fed to the anti-scalant recovery ED system 428 (e.g., the second and third stage ED units 450 and 452), as illustrated by arrow 400. In certain embodiments, the makeup water 254 may be fed to the first ED system 190, as illustrated by arrow 399. In addition, the makeup water 254 may be fed to both the ED systems 190, 428. The makeup water 254 may also be used as cooling tower makeup and other non-potable water uses (e.g., wash water, irrigation, etc.).

The HCl and NaOH production system 66 also includes the first and second EDBM units 258, 260, and a third EDBM unit 490 (e.g., Electromat Electrodialysis and Bipolar Electrodialysis manufactured by GE Power and Water of Trevose, Pa.) that enable production of the HCl 72, 100 and NaOH 70, 150, as discussed above with reference to FIG. 3. The EDBM units 258, 260, and 490 may be three cell membranes including the brine section 264, the acid section 266, and the caustic section 268. In the illustrated embodiment, the EDBM unit 258 receives the first NaCl brine stream 250 from the second RO system 248. In addition to receiving the first NaCl brine stream 250, the EDBM unit 258 also receives the makeup HCl 370 (having approximately 0.5 wt % to approximately 4 wt % HCl) and the makeup NaOH 368 (having approximately 0.5 wt % to approximately 4 wt % NaOH) from the EDBM unit 490 (e.g., makeup EDBM) to facilitate production of the HCl 100 and NaOH 150. Within the EDBM unit 258 (e.g., export EDBM), chloride is extracted from the first NaCl brine stream 250 to produce a first HCl stream 492 (e.g., approximately 4 wt % to approximately 7 wt % HCl) and a first NaOH stream 494 (e.g., approximately 5 wt % to 12 wt % NaOH). The HCl stream 492 is fed to the HCl evaporator 300 and the NaOH stream 494 is fed to the NaOH evaporator 302 (e.g., a vacuum evaporator). The second ED brine stream 280 may be combined with the first concentrated brine stream 480 to mitigate buildup of residual sulfate.

The evaporators 300, 302 concentrate the HCl stream 492 and the NaOH stream 494, respectively, thereby generating the concentrated industrial grade HCl 72 (between approximately 15 wt % to approximately 20 wt % HCl) and the concentrated industrial grade NaOH 70 (between approximately 30 wt % and approximately 50 wt % NaOH). As should be noted, at least a portion of the HCl stream 492 and the NaOH stream 494 may be used to provide the HCl 100 and NaOH 150, respectively, to the various streams and components of the system 10. In certain embodiments, the HCl evaporator 300 is a mechanical vapor recompression (MVR) evaporator system. The MVR evaporator system includes a condenser and a compressor. During concentration of the HCl stream 492, the HCl evaporator 300 generates water vapor. The water vapor and HCl may form an azeotrope, resulting in the presence of HCl in the water vapor. Therefore, a portion of the makeup water 254 from the second RO system 248 may be fed to the HCl evaporator 300, as illustrated by arrow 496. The portion of the makeup water 496 may be used as scrubbing water for removal of HCl from the water vapor. Removing HCl from the water vapor may mitigate undesirable effects of HCl on other components of the evaporator 300 (e.g., the compressor). In certain embodiments, spent scrubbing water 498 (having approximately less than 1 wt % HCl) may be routed to the acid section 266 of the EDBM 260 and used as makeup acid for the production of a second HCl stream 500. The second HCl stream 500 may be fed to the acid compartment 266 of the EDBM 490, thereby facilitating production of the makeup HCl 370 provided to the EDBM 258. In other embodiments, the spent scrubbing water 498 may form part of the HCl 100.

Similar to the evaporator 300, the NaOH evaporator 302 (e.g., a vacuum evaporator) generates a water vapor stream 502 during concentration of the NaOH stream 494. The water vapor stream 502 may be fed to the heat exchanger 96 to heat the third softened brine stream 388 upstream of the stripper 178. After transferring heat in the heat exchanger 96, the condensed water vapor may be fed to the EDBM 258 as makeup water.

As discussed above, the first stage ED concentrated stream 456 is routed to the HCl and NaOH production system 66 to facilitate production of the HCl 72, 100 and NaOH 70, 150. The first stage ED concentrated stream 456 may have a large amount of NaCl (e.g. between approximately 30 g/L (30,000 ppm) and approximately 60 g/L (60,000 ppm) NaCl), which may be used by the EDBM units 258, 260, and 490 to generated HCl and NaOH. Accordingly, the first stage ED concentrated stream 456 may be fed to the EDBM unit 490. The EDBM unit 490 may use the first stage ED concentrated stream 456 to generate the HCl makeup 370 and NaOH makeup 368 fed to the EDBM unit 258. However, prior to feeding the first stage ED concentrated stream 456 to the EDBM unit 490, the first stage ED concentrated stream 456 may be treated with the oxidizing agent 186 to ionize arsenate and enable removal of the arsenate in a second absorber 506. The second absorber 506 operates similarly to the first absorber 224 discussed above. The second absorber 506 may operate at a pH of between approximately 5 and approximately 6. The pH in the second absorber 506 in combination with a residence time of between approximately 1 minute and approximately 5 minutes may minimize co-absorption of silica (approximately 0.01 g/L (100 ppm) silica) in the stream 456. In certain embodiments, the stream 456 may be treated with sodium bisulfate ($NaHSO_4$) to remove residual oxidizing agent 186 before removal of the arsenic in the second absorber 506. A second arsenic-rich stream 508 is combined with the first arsenic-rich stream 472 and fed to the fifth filter 476 to generate the arsenic-lean stream 478, as discussed above. A third NaCl brine stream 510 is fed to the EDBM unit 490, thereby generating the HCl and NaOH makeup streams 368 and 370, respectively, and a second EDBM brine stream 512. The sections 266, 268 of the EDBM unit 490 also receive the second HCl stream 500 from the EDBM unit 260 and the makeup water 254, as illustrated by arrow 514, and caustic condensate from the NaOH evaporator 302.

The second EDBM brine stream 512 (having between approximately 15 g/L and approximately 50 g/L NaCl) is fed to the EDBM unit 260 (e.g., an internal NaOH consumption EDBM). Additionally, the acid section 266 of the EDBM unit 260 receives the spent scrubbing water 498 from the HCl evaporator 300 to enable production of the third HCl stream 500. The caustic section 268 of the EDBM unit 260 is fed a third EDBM brine stream 520 generated in the brine compartment 264 of the EDBM 260. The third EDBM brine stream 520 may have less than approximately 5 g/L (5,000 ppm) NaCl, and enables production of the NaOH 150 used to regenerate the softeners 386, 424 and to adjust the pH of various streams within the system 10.

Present embodiments also include a method that utilizes the softener 386 to remove hardness and divalent elements/compounds from the brine stream 30 upstream of the second NF unit 116 and the mineral removal system 32. The HCl and NaOH production system 66 may feed HCl and NaOH to regenerate the softener 386 and enable recovery of the hardness and divalent elements/compounds. In this way, the operational costs of the system 10 may be decreased due, in part, to the use of less expensive non-selective membranes in the ED systems 190, 428 (compared to higher cost ion selective membranes), recovery of the anti-scalant 108, and production of NSF 60 certified HCl and NaOH (e.g., HCl 72, 100 and NaOH 70, 150). FIG. 7 is a flow diagram of a method 530 by which a wastewater treatment system (e.g., the wastewater treatment system 10 described above) may remove hardness and divalent elements from a brine stream (e.g., the brine stream 30), recover anti-scalant (e.g., the anti-scalant 108), and generate HCl and NaOH (e.g., the HCl 72, 100 and NaOH 72, 150). In certain embodiments, the first RO system 20 supplies the second ion exchange softener 386 with the brine stream 30 to generated the third softened brine stream 388 and the softener brine stream 392 (block 532), as described above with reference to FIG. 5. The second ion exchange softener 386 removes Ca, Mg, Fe, Mn, Sr, Ba and other hardness compounds from the brine stream 30. In addition, the second ion exchange softener 386 converts bicarbonate to $CO_2$. Therefore the amount of HCl 100 used in the system 10 may be decreased. For example, in general, the brine stream 30 is treated with HCl to convert the bicarbonate to $CO_2$. However, because the second ion exchange softener 386 is configured to convert the bicarbonate to $CO_2$, the brine stream 30 may not need to be treated with HCl, thereby reducing HCl usage.

The method 530 also includes treating the third softened brine stream 388 with the anti-scalant 108 (block 534) and directing the third softened brine stream 388 to the second NF system 116 and the first ED system 190 to generate desalinated water 28 and the first ED brine stream 196 (block 538). In certain embodiments, the third softened brine stream 388 includes silica ($SiO_2$) that may cause scaling during desalination of the third softened brine stream 388 in the second NF system 116. Therefore, the third softened brine stream 388 may be treated with the anti-scalant 108 to mitigate scaling. The second NF system 116 removes sulfate ($SO_4$) from the third softened brine stream 388, and the first ED system 190 removes greater than 95% of NaCl from the third softened brine stream 388, thereby generating the desalinated water 28 and the first ED brine stream 196 (NaCl brine). Because most of the hardness and divalent compounds (e.g., greater than 98%) are removed in the second ion exchange softener 386, the first ED system 190 may use less expensive non-selective membranes to desalinate the water (e.g., from the brine stream 30)

The method 530 further includes feeding the softener brine stream 392 to the mineral removal system 32 and recovering the hardness and divalent elements/compounds (block 542). For example, the softener brine stream 392 is fed to the magnesium hydroxide removal system 168 to recover the magnesium from the softener brine stream 392, thereby generating the magnesium hydroxide 54. Overflow from the magnesium hydroxide removal system 168 is fed to the gypsum recovery system 140 to recover calcium and sulfate, thereby producing the gypsum 46. The magnesium hydroxide 54 and the gypsum 46 may be sold as industrial grade products.

The method 530 also supplying the first softened NF non-permeate stream 398 to the mineral removal system 32 and recovering the anti-scalant 108 to generate a NaCl brine (e.g., the first stage ED concentrate stream 456) (block 546). The recovered anti-scalant 108 may be recirculated through-out the system 10, thereby decreasing costs associated with the purchase of the anti-scalant 108. In certain embodiments, the anti-scalant 108 may be sold as an industrial grade anti-scalant.

The method 530 also includes supplying NaCl brine streams (e.g., the first ED brine stream 196 and the first stage ED concentrate stream 456) from the first ED system 190 and the anti-scalant recovery ED system 428 to the HCl and NaOH production system 66 to generate the HCl and NaOH (e.g., HCl 72, 100 and NaOH 70, 150) (block 548). For example, the HCl and NaOH production system 66 includes the systems 482, 248 and EDBM units 258, 260, 490 that facilitate production of the HCl, 72, 100 and NaOH 70, 150, as discussed above with reference to FIG. 6. The HCl 72, 100 and NaOH 70, 150 generated by the HCl and NaOH production system 66 are NSF 60 certified quality. The produced HCl and NaOH may be recirculated throughout the system 10 (e.g., the HCl 100 and NaOH 150) and/or may be sold as high purity concentrated industrial grade HCl 72 and NaOH 70. Because the system 10 may use the HCl 100 and NaOH 150 generated by the HCl and NaOH production system 66, costs associated with the purchase of National Sanitation Foundation (NSF) Standard 60 certified HCl and NaOH may be reduced.

The method 530 further includes directing the HCl 100 and NaOH 150 to the softeners 386, 424 to generate the concentrated chloride brine stream 110 and regenerate the softeners 386, 424 (block 550). In this way, the system 10 may continue to remove and recover the hardness and divalent compounds as industrial grade products.

As described above, certain embodiments of the water processing system 10 use ion exchange softeners (e.g., the softeners 386, 424) to generate softened brine streams (e.g., streams 388, 486) upstream of nanofiltration and electrodialysis systems. In this way, hardness and divalent ions may be removed from brine streams before nanofiltration and electrodialysis, and enabling the use of lower cost non-selective membranes in the electrodialysis systems (e.g., the ED systems 190, 428). Moreover, the ion exchange softeners may convert bicarbonate in the brine stream (e.g., the brine stream 30) to $CO_2$, thereby decreasing an amount of HCl used by the system 10 (e.g., in treating the brine stream 30 to convert the bicarbonate to the $CO_2$ 180). Additionally, the water processing system 10 may recover and recycle anti-scalant (e.g., the anti-scalant 108) and generate NSF certified HCl and NaOH. Therefore, costs associated with the purchase of anti-scalant, HCl, and NaOH may be reduce. Accordingly, the total operation cost of the system 10 may also be reduced.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
   treating a first brine stream comprising a plurality of minerals with an anti-sealant to produce a treated brine, wherein the first brine stream is provided by a wastewater treatment system;
   directing the treated brine to a first nanofiltration (NF) system disposed downstream from and fluidly coupled to the wastewater treatment system;
   generating a first NF permeate stream and a first NF non-permeate stream from the treated brine in the first NF system;

directing the first NF non-permeate stream to a mineral removal system disposed downstream from and fluidly coupled to the first NF system;

removing the plurality of minerals from the first NF non-permeate stream to generate a first overflow stream in the mineral removal system; wherein the first overflow stream comprises at least a portion of the plurality of minerals;

routing a first portion of the first overflow stream to a hydrochloric acid (HCl) and sodium hydroxide (NaOH) production system disposed downstream from and fluidly coupled to the mineral removal system, wherein the HCl and NaOH production system comprises a second NF system configured to receive the first portion of the first overflow stream and to generate a second brine stream from the first portion of the first overflow stream; and directing the second brine stream to a first electrodialysis (ED) system disposed within the HCl and NaOH production system and fluidly coupled to the second NF system, wherein the first ED system is configured to generate HCl and NaOH from the second brine stream.

2. The method of claim 1, comprising directing the first NF permeate stream to a second ED system disposed upstream of and fluidly coupled to the HCl and NaOH production system, wherein the second ED system is configured to generate a third brine stream from the first NF permeate stream, and combining the third brine stream with the second brine stream.

3. The method of claim 1, comprising directing a second portion of the first overflow stream to a magnesium hydroxide removal system configured to remove magnesium from the second portion of the first overflow stream and to generate a second overflow stream.

4. The method of claim 3, comprising combining the second overflow stream with the first overflow stream.

5. The method of claim 1, comprising directing the second brine stream to an ion exchange softener disposed upstream of the first ED system, and generating a calcium chloride brine stream and a first sodium chloride brine stream from the second brine stream.

6. The method of claim 5, comprising directing the first sodium chloride brine stream to the first ED system and generating a second sodium chloride brine stream.

7. The method of claim 6, comprising directing the second sodium chloride brine stream to the second NF system and combining the second sodium chloride brine stream with the second brine stream.

8. The method of claim 1, wherein the anti-scalant comprises a gypsum anti-scalant, a barium sulfate anti-scalant, or a combination thereof.

9. The method of claim 1, comprising filtering the treated brine stream upstream of the first NF system.

10. The method of claim 1, comprising generating the first overflow stream in a gypsum removal system disposed within the mineral removal system.

11. A system, comprising:
a first nanofiltration (NF) system configured to generate a first NF permeate stream and a first NF non-permeate stream from a first brine stream from a water treatment system;
a mineral removal system disposed downstream from and fluidly coupled to the first nanofiltration system, wherein the mineral removal system is configured to receive the first NF non-permeate stream and to output an overflow stream; and
a hydrochloric (HCl) and sodium hydroxide (NaOH) production system comprising a second NF system disposed downstream from and fluidly coupled to the mineral removal system and a first electrodialysis (ED) system, wherein the second NF system is configured to receive the overflow stream from the mineral removal system to generate a second brine stream, and the first ED system is configured to receive the second brine stream to generate HCl and NaOH.

12. The system of claim 11, comprising an overflow tank fluidly coupled to the mineral removal system and to the second NF system, wherein the overflow tank is configured to direct a first portion of the overflow stream to the second NF system and a second portion of the overflow stream to the mineral removal system.

13. The system of claim 12, wherein the mineral removal system comprises a gypsum removal system and a magnesium removal system, wherein the gypsum removal system is configured to receive the first NF non-permeate stream and to generate the first portion of the overflow stream and the magnesium hydroxide removal system is configured to receive the second portion of the overflow stream from the overflow tank.

14. The system of claim 11, comprising a second ED system fluidly coupled to the first NF system and to the HCl and NaOH production system, wherein the second ED system is configured to receive the NF permeate stream and to generate a third brine stream.

15. The system of claim 14, comprising a feed tank disposed within the HCl and NaOH production system, wherein the feed tank is fluidly coupled to the first and second ED systems, and the feed tank is configured to receive the second and third brine streams.

16. The system of claim 15, comprising a reverse osmosis system fluidly coupled to the feed tank, wherein the reverse osmosis system is configured to receive the second and third brine streams to generate a sodium chloride brine stream.

17. The system of claim 11, comprising an ion exchange system disposed within the HCl and NaOH production system, wherein the ion exchange system is configured to receive the first brine stream and to generate a calcium chloride brine and a sodium chloride brine.

18. A system, comprising:
a hydrochloric acid (HCl) and sodium hydroxide (NaOH) production system comprising:
a nanofiltration (NF) system configured to generate an NF permeate stream and an NF non-permeate stream from a first brine stream;
a first electrodialysis (ED) system downstream from and fluidly coupled to the NF system, wherein the first ED system is configured to receive the NF permeate stream and to generate a second brine stream; and
a mineral removal system fluidly coupled to the HCl and NaOH production system and configured to output the first brine stream, wherein the mineral removal system comprises:
a mineral removal section configured to remove minerals from a third brine stream generated in wastewater treatment system; and
an overflow tank fluidly coupled to the mineral removal section and the NF system, wherein the overflow tank is configured to receive an overflow stream from the mineral removal section and to direct at least a portion of the overflow stream to the NF system to generate the NF permeate stream and the NF non-permeate stream.

19. The system of claim 18, comprising a reverse osmosis (RO) system disposed within the HCl and NaOH production system and fluidly coupled to the first ED system and a second ED system disposed within the HCl and NaOH production system, wherein the RO system is configured to receive the first brine and direct the first brine to the second ED system to generate HCl and NaOH.

20. The system of claim 19, wherein the first ED system and the second ED system are fluidly coupled, and wherein the second ED system is configured to generate a fourth brine stream and to direct the fourth brine stream to the first ED system, and wherein the fourth brine stream is combined with the first brine stream.

\* \* \* \* \*